United States Patent [19]
Okada et al.

[11] Patent Number: 4,820,026
[45] Date of Patent: Apr. 11, 1989

[54] FERROELECTRIC LIQUID CRYSTAL DEVICE WITH MODIFIED POLYVINYL ALCOHOL ALIGNMENT FILM

[75] Inventors: Shinjiro Okada, Kawasaki; Kazuo Yoshinaga, Machida; Osamu Taniguchi; Hideyuki Kawagishi, both of Kawasaki; Akira Tsuboyama, Tokyo; Yukio Hanyu, Yokohama; Masataka Yamashita, Kawasaki; Kazuharu Katagiri, Tama, all of Japan

[73] Assignee: Canon Kabushiki Kaisha, Tokyo, Japan

[21] Appl. No.: 26,977

[22] Filed: Mar. 17, 1987

[30] Foreign Application Priority Data

| Mar. 20, 1986 | [JP] | Japan | 61-063457 |
|---|---|---|---|
| May 15, 1986 | [JP] | Japan | 61-109444 |
| May 15, 1986 | [JP] | Japan | 61-109445 |
| May 15, 1986 | [JP] | Japan | 61-109446 |
| May 15, 1986 | [JP] | Japan | 61-109447 |
| May 15, 1986 | [JP] | Japan | 61-109448 |
| May 15, 1986 | [JP] | Japan | 61-109449 |
| May 15, 1986 | [JP] | Japan | 61-109450 |
| May 15, 1986 | [JP] | Japan | 61-109451 |
| May 22, 1986 | [JP] | Japan | 61-118531 |
| Jun. 3, 1986 | [JP] | Japan | 61-128811 |
| Jun. 3, 1986 | [JP] | Japan | 61-128812 |
| Jun. 11, 1986 | [JP] | Japan | 61-133774 |
| Jun. 11, 1986 | [JP] | Japan | 61-133775 |

[51] Int. Cl.[4] .................................................. G02F 1/13
[52] U.S. Cl. .............................. 350/341; 350/350 S
[58] Field of Search ......................... 350/341, 350 S

[56] References Cited

U.S. PATENT DOCUMENTS

| 4,561,725 | 12/1985 | Hotta | 350/341 |
|---|---|---|---|
| 4,561,726 | 12/1985 | Goodby | 350/341 |
| 4,586,791 | 5/1986 | Isogai | 350/341 |
| 4,664,480 | 5/1987 | Geary et al. | 350/350 S X |

FOREIGN PATENT DOCUMENTS

| 2916670 | 11/1980 | Fed. Rep. of Germany | 350/341 |
|---|---|---|---|
| 101817 | 6/1982 | Japan | 350/341 |
| 59-214824 | 12/1984 | Japan . | |
| 61-094024 | 5/1986 | Japan | 350/350 S |
| 61-219931 | 9/1986 | Japan | 350/350 S |

Primary Examiner—Stanley D. Miller
Assistant Examiner—Richard F. Gallivan
Attorney, Agent, or Firm—Fitzpatrick Cella, Harper & Scinto

[57] ABSTRACT

A liquid crystal device comprises a pair of parallel substrates and a ferroelectric liquid crystal disposed between the substrates so as to have an arrangement of molecules forming a plurality of layers perpendicular to the faces of the substrates. At least one of the pair of substrates has an alignment control film formed of a modified polyvinyl alcohol resin having a function of aligning said plurality of layers preferentially in one direction. The modified polyvinyl alcohol resin film stably provides a uniform alignment state with a larger tilt angle than a conventional alignment control film of polyimide or unmodified polyvinyl alcohol.

49 Claims, 5 Drawing Sheets

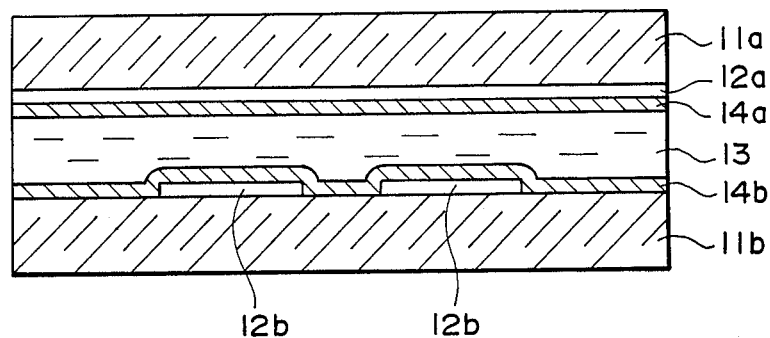
F I G. 1A
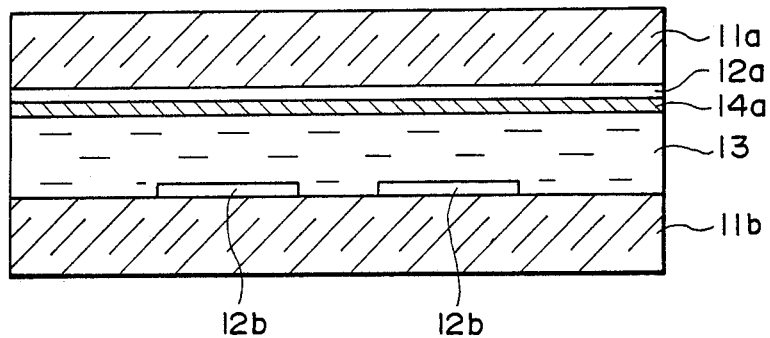
F I G. 1B

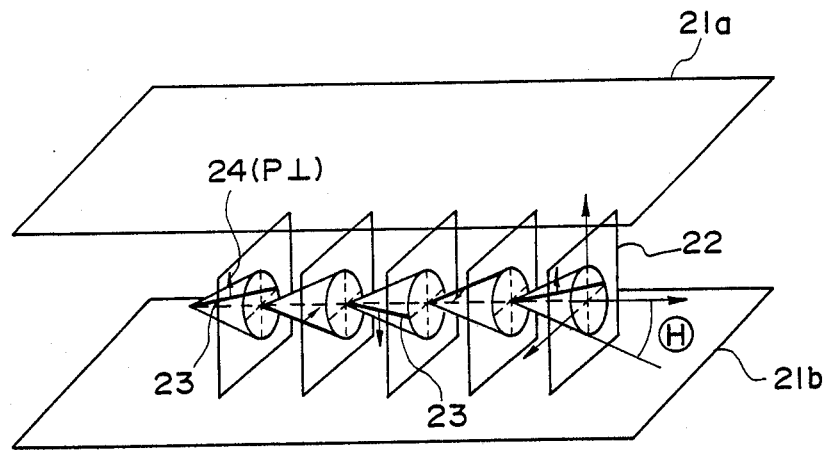
F I G. 2
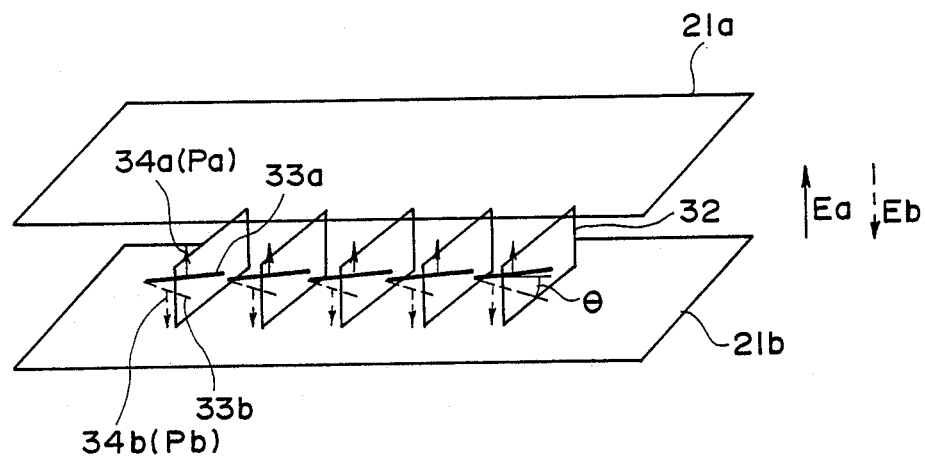
F I G. 3

FERROELECTRIC LIQUID CRYSTAL DEVICE WITH MODIFIED POLYVINYL ALCOHOL ALIGNMENT FILM

FIELD OF THE INVENTION AND RELATED ART

This invention relates to a liquid crystal device to be used in a liquid crystal display device or a liquid crystal-optical shutter, etc., particularly a liquid crystal device having a ferroelectric liquid crystal, more particularly to a liquid crystal device with improved display characteristics through an improvement in the initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal has generally chiral smectic C phase (SmC*) or H phase (SmH*) and, under this state, shows a property of taking either one of a first optically stable state and a second optically stable state responding to an applied electric field and maintaining such state in the absence of an electrical field, namely bistability, and also has a rapid response to change in the electrical field. Thus, it is expected to be utilized in a high speed and memory type display device.

For an optical modulating device by use of a liquid crystal having such bistability to exhibit desirable driving characteristics, it is required that the liquid crystal arranged between a pair of parallel substrates should be in such a molecular arrangement state that conversion between the above two stable states may occur effectively irrespectively of the application of an electrical field. For example, for a ferroelectric liquid crystal having SmC* or SmH* phase, it is necessary to form a domain (monodomain) in which the liquid crystal molecular layers having the SmC* or SmH* phase are arranged perpendicular to the substrate surfaces, and therefore the liquid crystal molecular axes are arranged substantially parallel to the substrate surfaces.

As methods for aligning ferroelectric liquid crystal, the use of an alignment control film applied with uniaxial orientation treatment by way of rubbing or oblique vapor deposition has been generally known.

Most conventional alignment methods have been used for ferroelectric liquid crystals having a helical structure and not exhibiting bistability. For example, the alignment method disclosed in European Laid-Open Patent Application No. 91661 or Japanese Laid-Open Patent Application No. 230635/1985 controls alignment of a ferroelectric liquid crystal with a polyimide, polyamide or polyvinyl alcohol film subjected to rubbing treatment under the state of a helical structure exhibiting no bistability.

However, when the alignment control film of the prior art as described above is applied for alignment control of a ferroelectric liquid crystal with a non-helical structure exhibiting bistability reported by Clark and Lagerwall, the problems as described below are involved.

That is, according to our experiments, it has been found that a tilt angle $\theta$ (an angle shown in FIG. 3 as described below) in a ferroelectric liquid crystal with a nonhelical structure obtained by alignment with an alignment control film of the prior art has become smaller as compared with a tilt angle ⒽⒽ (the angle ⒽⒽ is a half of the apex angle of the cone shown in FIG. 2 as described below) in the ferroelectric liquid crystal having a helical structure. Particularly, the tilt angle $\theta$ in a ferroelectric liquid crystal with a nonhelical structure obtained by alignment with alignment control films of the prior art was found to be generally several degrees, and the transmittance at that time was at most about 3 to 5%.

Thus, according to Clark and Lagerwall, the tilt angle in a ferroelectric liquid crystal with a nonhelical structure realizing bistability should have the same angle as the tilt angle in the ferroelectric liquid crystal having a helical structure, but in fact the tilt angle $\theta$ in a nonhelical structure is smaller than the tilt angle ⒽⒽ in a helical structure. In other words, for the tilt angle $\theta$ to take the maximum tilt angle ⒽⒽ, the alignment state of the liquid crystal molecules should be the uniform alignment shown in FIG. 4. Practically, however, it is under the splay alignment wherein adjacent respective liquid crystal molecules are twisted at a twist angle $\alpha$ as shown in FIG. 5, there has been a problem that no sufficiently large tilt angle $\theta$ can be formed. Also, a liquid crystal device under the splay alignment state exhibits an optical responsive characteristic to a pulse signal as shown in FIG. 7, and the optical responsive characteristic has posed a problem of causing flickering on a display picture when multiplexing drive is utilized.

SUMMARY OF THE INVENTION

Accordingly, an object of the present invention is to solve the problems as described above, namely to provide a liquid crystal device improved in transmittance at the time of shutter opening of the pixels by increasing the tilt angle in a ferroelectric liquid crystal with a nonhelical structure realizing at least two stable states, particularly showing bistability.

It is also another object of the present invention to provide a liquid crystal device which is free from flickering on a display picture during multiplexing drive.

More specifically, the present invention can provide a ferroelectric liquid crystal device with a uniform alignment state as shown in FIG. 4 by use of a specific alignment control film, whereby a liquid crystal device exhibiting an optical responsive characteristic to a pulse signal as shown in FIG. 6 and free from flickering on the picture during multiplexing drive can be realized.

The specific alignment control film used in the present invention can be formed of a modified polyvinyl alcohol resin. Particularly, by use of a silane-modified product as the modified polyvinyl alcohol resin, a ferroelectric liquid crystal device with a uniform alignment state as described above can be realized.

More specifically, the present invention provides a liquid crystal device having a pair of parallel substrates and a ferroelectric liquid crystal having an arrangement of molecules forming a plurality of layers perpendicular to the faces of the pair of parallel substrates, wherein at least one substrate of the pair of parallel substrates has an alignment control film formed of a modified polyvinyl alcohol resin which aligns the plurality of layers preferentially in one direction.

BRIEF DESCRIPTION OF THE DRAWINGS

FIGS. 1A and 1B are each sectional view showing an embodiment of the liquid crystal device of the present invention;

FIG. 2 is a perspective view showing schematically a liquid crystal device by use of a ferroelectric liquid crystal with a helical structure;

FIG. 3 is a perspective view showing schematically a liquid crystal device by use of a ferroelectric liquid crystal with a nonhelical structure;

DETAILED DESCRIPTION OF THE INVENTION

Figure 5:
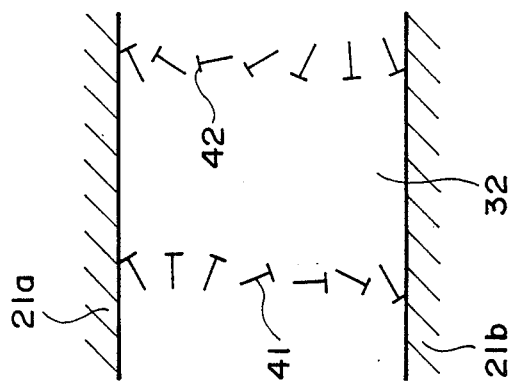
FIG. 5 is a sectional view showing schematically a splay alignment state.

FIGS. 1A and 1B are each sectional view showing an embodiment of the liquid crystal device of the present invention. The liquid crystal device shown in FIG. 1A has a pair of an upper substrate 11a and a lower substrate 11b arranged in parallel and transparent electrodes 12a and 12b disposed on the respective substrates. Between the upper substrate 11a and the lower substrate 11b is interposed a ferroelectric liquid crystal, preferably a ferroelectric liquid crystal 13 with a nonhelical structure having at least two stable states.

Each of the transparent electrodes 12a and 12b is disposed in a stripe for multiplex driving of the ferroelectric liquid crystal 13, and it is preferable that the stripes are arranged to cross each other.

In the liquid crystal device shown in FIG. 1A, alignment control films 14a and 14b formed of a modified polyvinyl alcohol resin as mentioned above are disposed on the substrate 11a and 11b, respectively.

Also, it is possible to make either one of the alignment control films 14a and 14b used in the liquid crystal device shown in FIG. 1A of a modified polyvinyl alcohol resin and the other one of an alignment control film other than modified polyvinyl alcohol resin. The alignment control film to be used in this case can be made a film formed of a polyimide, a polyimide or a non-modified polyvinyl alcohol.

Also, as shown in FIG. 1B, in the present invention, it is possible to omit use of the alignment control film 14b used in the liquid crystal device in FIG. 1A.

In the present invention, uniaxial orientation axis can be imparted to the alignment control films 14a and 14b as described above. The uniaxial orientation axis can be imparted preferably by rubbing. In this case, the uniaxial orientation axes as mentioned above can be made parallel to each other, but it is also possible to have them cross each other.

The modified polyvinyl alcohol to be used for the alignment control films 14a and 14b in the present invention may be a silicon-containing polyvinyl alcohol containing a silicon element. Specific examples of the modified polyvinyl alcohol may include those set forth below.

MODIFIED POLYVINYL ALCOHOL RESINS

Those containing structural units shown by either one of the following formulas (1a), (1b) and (1c).

(1) Silane-modified product

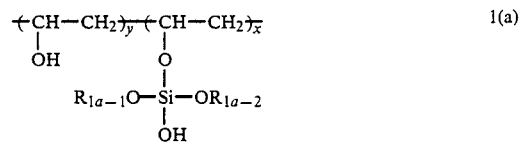

(wherein $R_{1a-1}$ and $R_{1a-2}$ are each an alkyl group having 1 to 8 carbon atoms, with $x/(x+y)$ (mol%) being 0.01 to 30 (mol%), preferably 1 to 20 (mol%).

(2) Silane-modified product

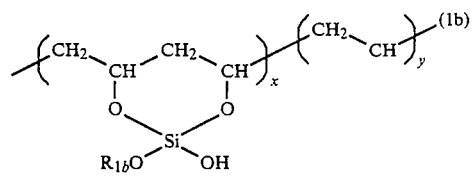

(wherein $R_{1b}$ represents an alkyl group having 1 to 8 carbon atoms with $x/(x+y)$ (mol%) being 0.01 to 30 (mol%), preferably 1 to 20 (mol%).

(3) Silane-modified product

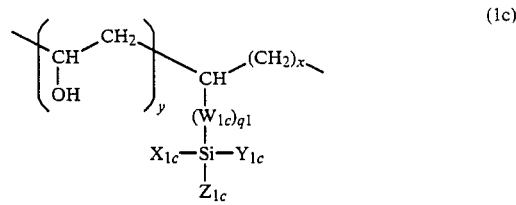

(wherein $X_{1c}$, $Y_{1c}$ and $Z_{1c}$ are each an alkyl group having 1 to 8 carbon atoms, an alkoxy group having 1 to 8 carbon atoms or hydroxy group, W is $-O-$, $-(CH_2)_{n1}$, $-O-(CH_2)_{m1}$ or $-O-(CH_2)_{m1}O-$; q1 represents 0 or 1, 11, m1 and n1 are integers of 1 to 8; $x/(x+y)$ (mol%) is 0.01 to 30 (mol%), preferably 1 to 20 (mol%).

The modification degree in the above polyvinyl alcohol resin represented by the formulae (1a–1c) may be suitably 30 mol% or less, preferably within the range of from 1 mol% to 20 mol%. Particularly, in the present invention, 1 mol% to 10 mol% was found to be preferable. On the other hand, its polymerization degree may be 100 to 10,000, preferably 500 to 2000. In the present invention, the modified polyvinyl alcohol for providing ferroelectric liquid crystal with uniform alignment state may be suitably a silicon containing polyvinyl alcohol of the formula (1a)–(1c) as described above, and "R-1130", "R-2105" or "R-2130" (trade name) produced by Kuraray K.K. may be used a commercially available example. The polyvinyl alcohol may have a saponification degree of 80 mol% or more, preferably 85 mol% or more (saponification degree was measured by JIS K6726-1977).

Also, a modified polyvinyl alcohol containing a structural unit represented by the following formula (2) may also be preferably used.

(wherein $R_{2-1}$ and $R_{2-2}$ each represent an alkyl group having 1 to 6 carbon atoms or an aryl group).

This class of product is obtained by saponifying a block copolymer of a polyvinyl ester type polymer and a polysiloxane, which block polymer has been obtained by allowing a polyvinyl ester type polymer having at the polymer terminal end a group:

$$-\underset{\underset{R_{2-2}}{|}}{\overset{\overset{R_{2-1}}{|}}{Si}}-X_2$$

(wherein $X_2$ represents a halogen atom, $R_{2-1}$ and $R_{2-2}$ each represent an alkyl group having 1 to 6 carbon atoms or an aryl group) to react with a polysiloxane having at the terminal end a group:

$$Y_2-\underset{\underset{R_{2-4}}{|}}{\overset{\overset{R_{2-3}}{|}}{Si}}-$$

(wherein $Y_2$ represents a group selected from OM, OH, $OR_2$ ans X (M is an alkali metal, $R_2$ is an alkyl group having 1 to 6 carbon atoms and X is a halogen atom), $R_{2-3}$ and $R_{2-4}$ each represent an alkyl group having 1 to 6 carbon atoms or an aryl group).

In the following, specific examples of the polysiloxane are shown. In the following formulae, Me represents a methyl group, Et an ethyl group and Ph a phenyl group.

$$NaO-\underset{\underset{Me}{|}}{\overset{\overset{Me}{|}}{Si}}\!\!\left(\!\!O-\underset{\underset{Me}{|}}{\overset{\overset{Me}{|}}{Si}}\!\!\right)_{\!\!\overline{x}}\!\!O-\underset{\underset{Me}{|}}{\overset{\overset{Me}{|}}{Si}}-ONa$$

$$NaO-\underset{\underset{Et}{|}}{\overset{\overset{Et}{|}}{Si}}\!\!\left(\!\!O-\underset{\underset{Et}{|}}{\overset{\overset{Et}{|}}{Si}}\!\!\right)_{\!\!\overline{x}}\!\!O-\underset{\underset{Et}{|}}{\overset{\overset{Et}{|}}{Si}}-ONa$$

$$NaO-\underset{\underset{Ph}{|}}{\overset{\overset{Ph}{|}}{Si}}\!\!\left(\!\!O-\underset{\underset{Ph}{|}}{\overset{\overset{Ph}{|}}{Si}}\!\!\right)_{\!\!\overline{x}}\!\!O-\underset{\underset{Ph}{|}}{\overset{\overset{Ph}{|}}{Si}}-ONa,$$

$$HO-\underset{\underset{Me}{|}}{\overset{\overset{Me}{|}}{Si}}\!\!\left(\!\!O-\underset{\underset{Me}{|}}{\overset{\overset{Me}{|}}{Si}}\!\!\right)_{\!\!\overline{x}}\!\!O-\underset{\underset{Me}{|}}{\overset{\overset{Me}{|}}{Si}}-OH,$$

$$MeO-\underset{\underset{Me}{|}}{\overset{\overset{Me}{|}}{Si}}\!\!\left(\!\!O-\underset{\underset{Me}{|}}{\overset{\overset{Me}{|}}{Si}}\!\!\right)_{\!\!\overline{x}}\!\!O-\underset{\underset{Me}{|}}{\overset{\overset{Me}{|}}{Si}}-OMe,$$

$$Cl-\underset{\underset{Me}{|}}{\overset{\overset{Me}{|}}{Si}}\!\!\left(\!\!O-\underset{\underset{Me}{|}}{\overset{\overset{Me}{|}}{Si}}\!\!\right)_{\!\!\overline{x}}\!\!O-\underset{\underset{Me}{|}}{\overset{\overset{Me}{|}}{Si}}-OMe.$$

The reaction for producing the block copolymer in the present invention is schematically shown by the following reaction schemes (2-I), (2-II) and (2-III) by referring to an example for preparation of a block copolymer by the reaction between a polyvinyl acetate polymer having a terminal $$-\underset{\underset{Me}{|}}{\overset{\overset{Me}{|}}{Si}}-Cl$$

group and a polydimethylsiloxane having a $$NaO-\underset{\underset{Me}{|}}{\overset{\overset{Me}{|}}{Si}}-$$

group at both terminals.

$$\left(\!CH-CH_2\!\right)_{\!\overline{y}}\!\underset{\underset{O-CMe}{|}}{\overset{\overset{Me}{|}}{Si}}-Cl + NaO-\underset{\underset{Me}{|}}{\overset{\overset{Me}{|}}{Si}}\!\!\left(\!OSi\!\right)_{\!\overline{x}}\!O-\underset{\underset{Me}{|}}{\overset{\overset{Me}{|}}{Si}}-ONa \xrightarrow{-NaCl} \left(\!CH-CH_2\!\right)_{\!\overline{y}}\!\underset{\underset{O-CMe}{|}}{\overset{\overset{Me}{|}}{Si}}-O-\underset{\underset{Me}{|}}{\overset{\overset{Me}{|}}{Si}}\!\!\left(\!OSi\!\right)_{\!\overline{x}}\!O-\underset{\underset{Me}{|}}{\overset{\overset{Me}{|}}{Si}}-ONa$$
$$\underset{O}{\overset{\|}{}}\qquad\qquad\qquad\qquad\qquad\qquad\qquad\qquad\underset{O}{\overset{\|}{}}$$

(2-I)

$$\left(\!CH-CH_2\!\right)_{\!\overline{y}}\!\underset{\underset{O-CMe}{|}}{\overset{\overset{Me}{|}}{Si}}-O-\underset{\underset{Me}{|}}{\overset{\overset{Me}{|}}{Si}}\!\!\left(\!OSi\!\right)_{\!\overline{x}}\!O-\underset{\underset{Me}{|}}{\overset{\overset{Me}{|}}{Si}}-O-\underset{\underset{Me}{|}}{\overset{\overset{Me}{|}}{Si}}\!\!\left(\!CH_2-CH\!\right)_{\!\overline{y}} \xrightarrow{(CH_3)_3SiCl}$$
$$\underset{O}{\overset{\|}{}}\qquad\qquad\qquad\qquad\qquad\qquad\qquad\qquad\qquad\underset{O}{\overset{\|}{O-CMe}}$$

(2-II)

$$\left(\!CH-CH_2\!\right)_{\!\overline{y}}\!\underset{\underset{O-CMe}{|}}{\overset{\overset{Me}{|}}{Si}}-O-\underset{\underset{Me}{|}}{\overset{\overset{Me}{|}}{Si}}\!\!\left(\!OSi\!\right)_{\!\overline{x}}\!O-\underset{\underset{Me}{|}}{\overset{\overset{Me}{|}}{Si}}-O-SiMe_3$$
$$\underset{O}{\overset{\|}{}}$$

(2-III)

The polymerization degrees of the polyvinyl ester type polymer and the polysiloxane may be selected suitably depending on the composition, performance of the desired block copolymer, but may be 50 to 10000, preferably 100 to 2000 for the polyvinyl ester type polymer, and 5 to 5000, preferably 10 to 1000 for the polysiloxane, in view of balance between the reactivity of the terminal groups and the copolymer performance.

By saponifying the thus obtained block copolymer of a polyvinyl ester type polymer and a polysiloxane according to a conventional method to convert the polyvinyl ester type polymer into a partially or highly saponified polyvinyl alcohol type polymer, a block copolymer of a polyvinyl alcohol type polymer and a polysiloxane can be obtained.

The saponification reaction can be practiced according to known methods such as so-called alcoholysis in which the reaction is conducted under the co-presence of an alcohol with the use of saponification catalyst, or direct saponification in which an appropriate amount of an alkali or an acid is directly reacted in an aqueous system, but the method for saponification by the alcoholysis reaction by use of an alcohol under the co-presence of a saponification catalyst is preferable for precluding decomposition of the polysiloxane during saponification.

As the saponification catalyst, alkaline catalysts such as hydroxides of alkali metals (e.g. sodium hydroxide, potassium hydroxide), alcoholates (e.g. sodium methylate, potassium methylate) or ammonia, or acidic catalysts such as hydrochloric acid, sulfuric acid, etc., can be used.

The modification degree in the modified polyvinyl alcohol having the structural units of the formula (2) may be suitably 60 mol% or less, but preferably within the range of from 0.05 mol% to 50 mol%. Particularly, in the present invention, 0.05 mol% to 10 mol% is preferred. On the other hand, its polymerization degree may be 1000 to 90000, preferably 10000 to 70000.

The modified polyvinyl alcohol may have a saponification degree of 80 mol% or more, preferably 85 mol% or more.

Also, those having a film of a modified polyvinyl alcohol containing the structural units represented by the following formula (3) may be preferably used.

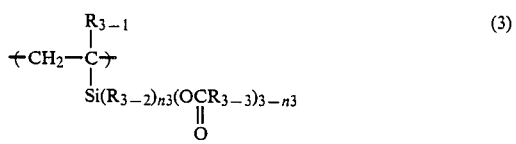

(wherein $R_{3-1}$ represents hydrogen atom or methyl group, $R_{3-2}$ represents hydrogen atom, a halogen atom, a lower alkyl group, an allyl group or a lower alkyl group having allyl group, $R_{3-3}$ represents a lower alkyl group and n3 represents an integer of 0 to 2).

This is obtained by saponifying a copolymer of vinyl acetate with a comonomer represented by the following formula (3-I):

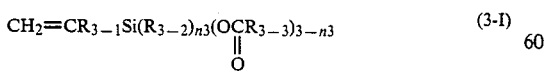

(wherein $R_{3-1}$ is hydrogen atom or methyl group, $R_{3-2}$ is hydrogen atom, a halogen atom, a lower alkyl group, allyl group or a lower alkyl group having allyl group, $R_{3-3}$ is a lower alkyl group and n3 is an integer of 0 to 2).

In the following, specific examples of the comonomer are shown.

Vinyltriacetoxysilane
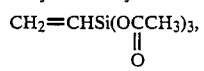

Vinyltripropionyloxysilane
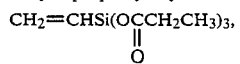

Isopropenyltriacetoxysilane
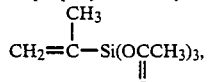

Vinylisobutyldiacetoxysilane
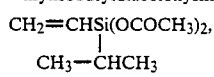

Vinylmethyldiacetoxysilane
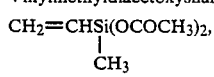

Vinyldimethylacetoxysilane
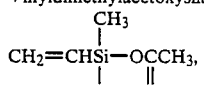

Vinylphenyldiacetoxysilane
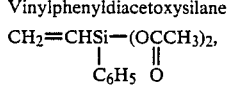

Vinylmonochlorodiacetoxysilane
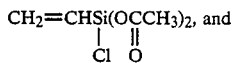
and

Vinylmonohydrogendiacetoxysilane
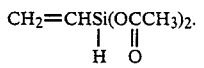

The modification degree in the modified polyvinyl alcohol having the structural units of the formula (3) may be suitably 30 mol% or less, but preferably within the range of from 0.05 mol% to 20 mol%. Particularly, in the present invention, 0.05 to 10 mol% is preferred. On the other hand, its polymerization degree may be 100 to 10000, preferably 500 to 20000.

The modified polyvinyl alcohol may have a saponification degree of 80 mol% or more, preferably 85 mol% or more.

Also, a modified polyvinyl alcohol containing a structural unit represented by the following formula (4) may be preferably used.

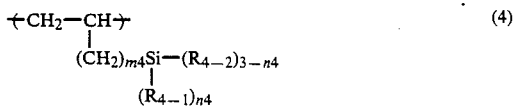

(wherein m4 is 0 or 1, n4 is 0 to 2, $R_{4-1}$ is a lower alkyl group, allyl group or a lower alkyl group having allyl group, $R_{4-2}$ is a saturated branched or nonbranched alkoxyl group having 1 to 40 carbon atoms, and said alkoxyl group may have a substituent containing oxygen).

This class of modified polyvinyl alcohol is obtained by saponifying a copolymer of vinyl acetate with a comonomer represented by the following formula (4-I):

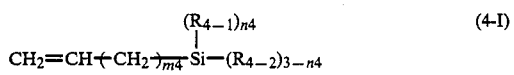

(wherein m4 is 0 to 1, n4 is 0 to 2, $R_{4-1}$ is a lower alkyl group, allyl group or a lower alkyl group having allyl group, $R_{4-2}$ is a saturated branched or non-branched alkoxyl group having 1 to 40 carbon atoms, and said alkoxyl group may have a substituent containing oxygen).

In the following, specific examples of the comonomer are shown.

Examples of the silicon-containing olefinic unsaturated monomer represented by the above formula (4-I) may include vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, allylmethyldimethoxysilane, allyldimethylmethoxysilane, allyltriethoxysilane, allyldimethylethoxysilane, vinyltris(β-methoxyethoxy)silane, vinylisobutyldimethoxysilane, vinylethyldimethoxysilane, vinylmethoxydibutoxysilane, vinyldimethoxybutoxysilane, vinyltributoxysilane, vinylmethoxydihexyloxysilane, vinyldimethoxyhexyloxysilane, vinyltrihexyloxysilane, vinylmethoxydioctyloxysilane, vinyldimethoxyoctyloxysilane, vinyltrioctyloxysilane, vinylmethoxydilauryloxysilane, vinyldimethoxylauryloxysilane, vinylmethoxyoleyloxysilane, vinyltriisopropoxysilane, vinyldimethylisopropoxysilane, vinyldimethoxyoleyloxysilane, etc.

The modification degree in the modified polyvinyl alcohol having structural units of the formula (4) may be suitably 30 mol% or less, but preferably within the range of from 0.05 to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

Also, those having a film of a modified polyvinyl alcohol containing the structural units represented by the following formula (5) may be preferably used.

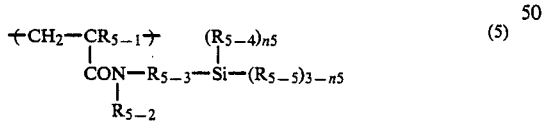

(wherein $R_{5-1}$ is hydrogen atom or methyl group, $R_{5-2}$ is hydrogen atom or a lower alkyl group, $R_{5-3}$ is an alkylene group or a divalent organic residue in which the chain carbon atoms are mutually bonded through an oxygen atom or a nitrogen atom, $R_{5-4}$ is hydrogen atom, a halogen atom, a lower alkyl group, an aryl group or a lower alkyl group having an aryl group, $R_{5-5}$ is hydroxyl group, a salt of hydroxyl group represented by the formula OM (M represents an alkyl metal or $NH_4^{\oplus}$), an alkoxy group or an acyloxy group (with proviso that alkoxyl group or acyloxy group is a saturated branched or non-branched alkoxy or acyloxy group having 1 to 40 carbon atoms, and may also have a substituent containing oxygen atom or nitrogen atom), n5 is an integer of 0 to 2).

This class of product is obtained by saponifying a copolymer of vinyl acetate with comonomer represented by the following formula (5-1):

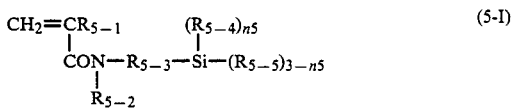

(wherein $R_{5-1}$, $R_{5-2}$, $R_{5-3}$, $R_{5-4}$ and $R_{5-5}$ and n5 have the same meanings as defined above).

In the following, specific examples of the comonomer are shown.

(Meth)acrylamide-straight chain or branched alkyl trialkoxysilane:
3-(meth)acrylamide-propyltrimethoxysilane
$$CH_2=CR.CNH.(CH_2)_3.Si(OCH_3)_3,$$
$$\|$$
$$O$$

3-(meth)acrylamide-propyltriethoxysilane
$$CH_2=CR-CNH-(CH_2)_3-Si(OCH_2CH_3)_3,$$
$$\|$$
$$O$$

2-(meth)acrylamide-propyltriisopropoxysilane
$$CH_2=CR-CNH-(CH_2)_3-Si(OiPr)_3,$$
$$\|$$
$$O$$

3-(meth)acrylamide-propyltriisobutyloxysilane
$$CH_2=CR-CNH-(CH_2)_3-Si(OiBu)_3,$$
$$\|$$
$$O$$

3-(meth)acrylamide-propyltri(β-methoxyethoxy)silane
$$CH_2=CR-CNH-(CH_2)_3-Si(OCH_2CH_2OCH_3)_3,$$
$$\|$$
$$O$$

3-(meth)acrylamide-propyltri(N—methylaminoethoxy)silane
$$CH_2=Cr-CNH-(CH_2)_3-Si(OCH_2CH_2NHCH_3)_3,$$
$$\|$$
$$O$$

2-(meth)acrylamide-ethyltrimethoxysilane
$$CH_2=CR-CNH-(CH_2)_2-Si-(OCH_3)_3,$$
$$\|$$
$$O$$

1-(meth)acrylamide-methyltrimethoxysilane
$$CH_2=CR-CNHCH_2-Si-(OCH_3)_3,$$
$$\|$$
$$O$$

2-(meth)acrylamide-2-methylpropyltrimethoxysilane

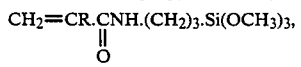

2-(meth)acrylamide-isopropyltrimethoxysilane
$$CH_2=CR-CONH-CHCH_2-Si(OCH_3)_3$$
$$|$$
$$CH_3$$

(R represents hydrogen atom or methyl group);

(Meth)acrylamide-nitrogen containing or oxygen containing alkyltrialkoxysilane:
N—(2-(meth)acrylamide-ethyl)aminopropyltrimethoxysilane
$$CH_2=CR-CONH-CH_2CH_2NH(CH_2)_3-Si(OCH_3)_3,$$
(3-(meth)acrylamide-propyl)-oxypropyltrimethoxysilane $CH_2=CR-CONH-(CH_2)_3-O-(CH_2)_3Si(OCH_3)_3$,
(R represents hydrogen atom or methyl group) and the like;

(Meth)acrylamide-alkyltriacyloxysilane:
3-(meth)acrylamide-propyltriacetoxysilane
$CH_2=CR-CONH(CH_2)_3-Si(OCOCH_3)_3$,
2-(meth)acrylamide-ethyltriacetoxysilane
$CH_2=CR-CONH(CH_2)_2-Si(OCOCH_3)_3$,
4-(meth)acrylamide-butyltriacetoxysilane
$CH_2=CR-CONH(CH_2)_4-Si(OCOCH_3)_3$,
3-(meth)acrylamide-propyltripropionyloxysilane
$CH_2=CR-CONH(CH_2)_3-Si(OCOCH_2CH_3)_3$, 2-(meth)acrylamide-2-methylpropyltriacetoxysilane
$$CH_2=CR-CONH-\underset{\underset{CH_3}{|}}{\overset{\overset{CH_3}{|}}{C}}-CH_2-Si(OCOCH_3)_3,$$

N—(2-(meth)acrylamide-ethyl)aminopropyltriacetoxysilane
$CH_2=CR-CONH-CH_2CH_2NH(CH_2)_3-Si(OCOCH_3)_3$,
(R represents hydrogen atom or methyl group) and the like;
(Meth)acrylamide-alkyldi or monoalkoxy or di or monoacyloxysilane:

3-(meth)acrylamide-propylisobutylmethoxysilane
$$CH_2=CR-CONH-(CH_2)_3-\underset{\underset{CH_3-CHCH_2CH_3}{|}}{Si(OCH_3)_2},$$

2-(meth)acrylamide-ethyldimethylmethoxysilane
$$CH_2=CR-CONH-(CH_2)_2-\underset{\underset{CH_3}{|}}{\overset{\overset{CH_3}{|}}{Si}}-OCH_3,$$

3-(meth)acrylamide-propyloctyldiacetoxysilane
$$CH_2=CR-CONH-(CH_2)_3-\underset{\underset{(CH_2)_7CH_3}{|}}{Si(OCOCH_3)_2},$$

1-(meth)acrylamide-methylphenyldiacetoxysilane
$$CH_2=CR-CONH-CH_2-\underset{\underset{C_6H_5}{|}}{Si(OCOCH_3)_2},$$

3-(meth)acrylamide-propylbenzylethoxysilane
$$CH_2=CR-CONH-(CH_2)_3-\underset{\underset{CH_2-C_6H_5}{|}}{Si-(OCH_2CH_3)_2},$$

2-(meth)acrylamide-2-methylpropylmonochlorodimethoxysilane
$$CH_2=CR-CONH-C(CH_3)_2-\underset{\underset{Cl}{|}}{CH_2Si-(OCH_3)_2},$$

2-(meth)acrylamide-2-methylpropylhydrogendimethoxysilane
$$CH_2=CR-CONH-\underset{\underset{CH_3}{|}}{\overset{\overset{CH_3}{|}}{C}}-CH_2-\underset{\underset{H}{|}}{Si(OCH_3)_2}$$

(R represents hydrogen atom or methyl group) and the like;

(N—alkyl-(meth)acrylamide)-alkyltrialkoxy or triacetoxysilane:
3-(N—methyl-(meth)acrylamide)-propyltrimethoxysilane
$$CH_2=CR-\underset{\underset{CH_3}{|}}{CON}-(CH_2)_3-Si(OCH_3)_3,$$

2-(N—ethyl-(meth)acrylamide)-ethyltriacetoxysilane
$$CH_2=CR-\underset{\underset{CH_2CH_3}{|}}{CON}-CH_2CH_2Si(OCOCH_3)_3,$$

(R represents hydrogen atom or methyl group) and the like.

The modification degree in the modified polyvinyl alcohol having the structural units of the formula (5) may be suitably 30 mol% or less, but preferably within the range of from 0.05 mol% to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

Also, those having a film of a polyvinyl alcohol type polymer containing reactive silicon groups obtained by hydrolysis of silyl group at the terminal end of molecule represented by the following formula (6) may be preferably used.

(wherein $R_{6-1}$ is a hydrocarbon group having 1 to 20 carbon atoms, $R_{6-2}$ is a group selected from an alkoxy group having 1 to 20 carbon atoms, a phenoxy group, an alkylphenoxy group or an acyloxy group (here alkoxy group, phenoxy group, alkylphenoxy group or acyloxy group may also have a substituent containing oxygen), $l6$ is an integer of 1 to 3).

This class of product is obtained by permitting a silyl thiol compound represented by the formula (6-I) shown below to be present during polymerization of a comonomer such as vinyl acetate, to synthesize a polyvinyl acetate type polymer having silyl group at the terminal end and saponifying the product polymer.

Formula (6-I)
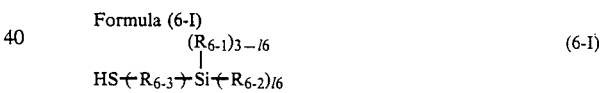

(wherein $R_{6-1}$ is a hydrocarbon group having 1 to 20 carbon atoms, $R_{6-2}$ is a group selected from an alkoxy group having 1 to 20 carbon atoms, a phenoxy group, an alkylphenoxy group or an acyloxy group (here alkoxy group, phenoxy group, alkylphenoxy group or acyloxy group may also have a substituent containing oxygen), $l6$ is an integer of 1 to 3).

Specific examples of the compound represented by the formula 6-I may include 3-(trimethoxysilyl)-propylmercaptan, 3-(triethoxysilyl)-propylmercaptan, 2-(trimethoxysilyl)-ethylmercaptan, 3-(dimethoxymethylsilyl)-propylmercaptan, 3-(monomethoxy-dimethylsilyl)-propylmercaptan and the like.

Also, as the vinyl alcohol type polymer having the basic structure of the formula (6) to be used in the present invention, in addition to polyvinyl alcohols having various polymerization degrees and saponification degrees, there are included not only saponified products of copolymers of vinyl esters, typically vinyl acetate, with a small amount of other polymerizable monomers (e.g., one or more of α-olefins such as ethylene, propylene, isobutylene, etc., alkyl vinyl ethers typically methyl vinyl ether, vinyl chloride, etc.), etc., but also polyvinyl alcohol type polymers such as cyanoethylated polyvinyl alcohol and others.

The modification degree in the modified polyvinyl alcohol having the basic structure of the formula (6) may be suitably 40 mol% or less, but preferably within the range of from 0.05 to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

Also, a saponified product of a copolymer obtained by copolymerization of a monomer represented by the following formula (7) with a vinyl ester may be used.

$$\begin{array}{c} CH=CH_2 \\ | \\ R_{7\text{-}4} \\ | \\ R_{7\text{-}3}-Si-R_{7\text{-}1} \\ | \\ R_{7\text{-}2} \end{array} \quad (7)$$

(wherein $R_{7\text{-}1}$, $R_{7\text{-}2}$ and $R_{7\text{-}3}$ each represent alkyl group, an aryl group, an alkyl group having aryl group, an alkoxy group or hydroxy group, at least one of $R_{7\text{-}1}$, $R_{7\text{-}2}$ and $R_{7\text{-}3}$ is hydroxy group, $R_{7\text{-}4}$ is $-(CH_2)_{n7}-$ or a divalent organic residue having $-(CH_2)_{n7}-$ and nitrogen atom, sulfur atom or oxygen atom, with proviso that n7 is 0 or an integer of 1 to 10).

For example, a saponified product of a copolymer of this class may be obtained by copolymerization of vinyl acetate which is a vinyl ester with a copolymerization monomer represented by the formula (7-I).

$$CH_2=CH-R_{7\text{-}4}-SiR_{7\text{-}1}R_{7\text{-}2}R_{7\text{-}3} \quad (7\text{-I})$$

(wherein $R_{7\text{-}1}$, $R_{7\text{-}2}$ and $R_{7\text{-}3}$ each represent an alkyl group (methyl, ethyl, n-propyl, iso-propyl, n-butyl, iso-butyl, t-butyl, n-amyl, t-amyl, n-hexyl, n-octyl, ti-octyl, sec-octyl, n-nonyl, n-decyl and the like), an aryl group (phenyl, tolyl, xylyl, biphenyl, naphthyl and the like), an alkyl group having aryl group, an alkoxy group (methoxy, ethoxy, propoxy, butoxy, acyloxy, hexyloxy and the like) or a hydroxy group, at least one of $R_{7\text{-}1}$, $R_{7\text{-}2}$ and $R_{7\text{-}3}$ is hydroxy group; $R_{7\text{-}4}$ is a divalent organic residue having $(CH_2)_{n7}$ or $(CH_2)_{n7}$ and nitrogen atom (N), sulfur atom (S) or oxygen atom (O)

$$(-O(CH_2)_{n7},\ -S(CH_2)_{n7},\ -\underset{\underset{O}{\|}}{C}-NH(CH_2)_{n7},$$

$$-\underset{\underset{O}{\|}}{S}(CH_2)_{n7},\ -NH(CH_2)_n);$$

with proviso that n7 is 0 or an integer of 1 to 10).

In the following, specific examples of the vinylsilane compound represented by the above formula are shown:

silicon containing olefinic unsaturated monomers such as vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, allylmethyldimethoxysilane, allyldimethylmethoxysilane, allyltriethoxysilane, allyldimethylethoxysilane, vinyltris(β-methoxyethoxy)-silane, vinylisobutyldimethoxysilane, vinylethyldimethoxysilane, vinylmethoxydibutoxysilane, vinyldimethoxybutoxysilane, vinyltributoxysilane, vinylmethoxydihexyloxysilane, vinyldimethoxyhexyloxysilane, vinyltrihexyloxysilane, vinylmethoxydioctyloxysilane, vinyldimethoxyoctyloxysilane, vinyltrioctyloxysilane, vinylmethoxydilauryloxysilane, vinyldimethoxydilauryloxysilane, vinylmethoxydioleyloxysilane, vinyltriisopropoxysilane, vinyldimethylisopropoxysilane, trimethoxysiloxyethylene (formula ①) show below, 1-acrylamidemethyltrimethoxysilane (formula ②), (phenyldimethylsilyl)methylmethacrylate (formula ③), 2-vinyl sulfoxide ethyltrimethoxysilane (formula ④), 1-vinylsulfidemethyltrimethoxysilane (formula ⑤), etc.

The formulae ①- ⑤ referred to above are shown below.

$$\begin{array}{c} CH_2=CH \\ | \\ O \\ | \\ Si(OCH_3)_3 \end{array} \quad ①$$

$$\begin{array}{c} CH_2=CH \\ | \\ \underset{\underset{O}{\|}}{C}-NHCH_2Si(OCH_3)_3 \end{array} \quad ②$$

$$\begin{array}{c} CH_3 \\ | \\ O-Si-CH_2O-\underset{\underset{O}{\|}}{C}-C=CH_3 \\ | \\ CH_3 \quad \quad CH_3 \end{array} \quad ③$$

$$\begin{array}{c} CH_2=CH \\ | \\ \underset{\underset{O}{\|}}{S}-CH_2CH_2Si(OCH_3)_3 \end{array} \quad ④$$

$$\begin{array}{c} CH_2=CH \\ | \\ S-CH_2Si(OCH_3)_3 \end{array} \quad ⑤$$

Also, as the vinyl alcohol type polymer having the basic structure of the formula (7) to be used in the present invention, in addition to polyvinyl alcohols having various polymerization degrees and saponification degrees, there are included not only saponified products of copolymers of vinyl esters, typically vinyl acetate, with a small amount of other polymerizable monomers (e.g. one or more of α-olefins such as ethylene, propylene, isobutylene, etc., alkyl vinyl ethers typically methyl vinyl ether, vinyl chloride, etc.), etc., but also polyvinyl alcohol type polymers such as cyanoethylated polyvinyl alcohol and others.

The modification degree in the modified polyvinyl alcohol having the basic structure of the formula (7) may be suitably 30 mol% or less, but preferably within the range of from 0.05 to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

The silyl group in the silicon containing modified polyvinyl alcohol used in the present invention is completely or partially hydrolyzed during saponification to be converted to hydroxy group, and may be estimated to exist in the coated film under the state of the structural formulae (a) to (c) shown below alone or as a mixture.

(a)
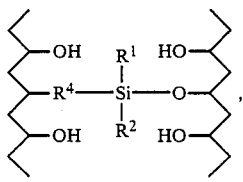

(b)
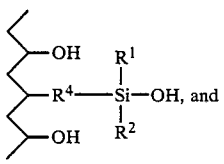

(c)
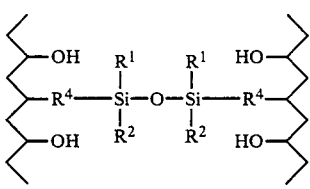

Further, the modified polyvinyl alcohol to be used in the alignment control films 14a and 14b of the present invention may also be a sulfur-containing polyvinyl alcohol.

Specific examples may be those as mentioned below.

First, sulfur-containing polyvinyl alcohols obtained by allowing alkylvinyl sulfoxide to react with polyvinyl alcohol may be employed. As the alkylvinyl sulfoxide, alkylvinyl sulfoxide having 1 to 10 carbon atoms such as methylvinyl sulfoxide, ethylvinyl sulfoxide, cyclohexylvinyl sulfoxide, benzylvinyl sulfoxide and the like may be preferably used.

The modification degree in the above modified sulfur containing polyvinyl alcohol resin to be used in the present invention may be suitably 30 mol% or less, preferably within the range of from 1 to 20 mol%. Particularly, in the present invention, 1 to 10 mol% was found to be preferable. On the other hand, its polymerization degree may be 100 to 10000, preferably 500 to 2000.

Also, a modified polyvinyl alcohol containing the structural units represented by the following formula (9) may be preferably used:

 (9)

(wherein $R_{9-1}$ represents an alkyl group having 1 to 10 carbon atoms, an aryl group or a lower alkyl group having aryl group).

This class of product is synthesized by allowing a compound represented by the following formula (9-I) to react with the hydroxyl group of the vinyl alcohol type polymer in the presence of a base catalyst.

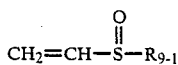 (9-I)

(wherein $R_{9-1}$ represents an alkyl group having 1 to 10 carbon atoms, an aryl group or a lower alkyl group having aryl group).

Specific examples of the compound represented by the formula (9-I) may include alkylvinyl sulfoxide having an alkyl group with 1 to 10 carbon atoms, vinyl sulfoxide having alicyclic hydrocarbon group and benzyl group such as those shown below:

methylvinyl sulfoxide
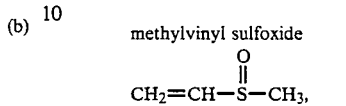

ethylvinyl sulfoxide
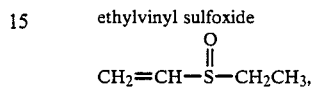

butylvinyl sulfoxide
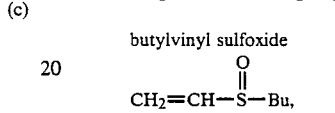

cyclohexylvinyl sulfoxide
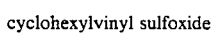
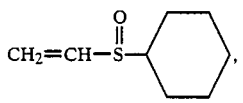

benzylvinyl sulfoxide
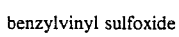
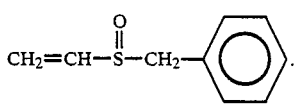

Also, as the vinyl alcohol type polymer having the basic structure of the formula (9) to be used in the present invention, in addition to polyvinyl alcohols having various polymerization degrees and saponification degrees, there are included not only saponified products of copolymers of vinyl esters, typically vinyl acetate, with a small amount of other polymerizable monomers (e.g. one or more of α-olefins such as ethylene, propylene, isobutylene, etc., alkyl vinyl ethers typically methyl vinyl ether, vinyl chloride, etc.), etc., but also polyvinyl alcohol type polymers such as cyanoethylated polyvinyl alcohol and others.

The modification degree in the modified polyvinyl alcohol having the basic structure of the formula (9) may be suitably 30 mol% or less, but preferably within the range of from 0.05 to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

Also, a modified polyvinyl alcohol containing the structural units represented by the following formula (10) may be preferably used.

 (10)

(wherein $R_{10-1}$ is an alkyl group having 1 to 10 carbon atoms, an aryl group or a lower alkyl having aryl group).

This class of product is obtained by saponification of a copolymer of vinyl acetate with a comonomer represented by the following formula (10-I).

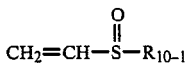  (10-I)

(wherein $R_{10-1}$ is an alkyl group having 1 to 10 carbon atoms, an aryl group or a lower alkyl having aryl group).

Specific examples of the comonomer may include alkylvinyl sulfoxide having an alkyl group with 1 to 10 carbon atoms, vinyl sulfoxide having alicyclic hydrocarbon group and benzyl group as preferable ones, for example:

methylvinyl sulfoxide

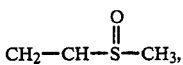

ethylvinyl sulfoxide

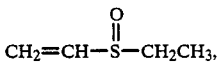

butylvinyl sulfoxide

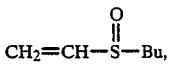

cyclohexylvinylsulfoxide

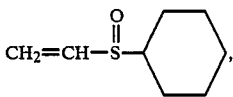

benzylvinyl sulfoxide

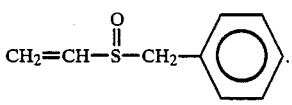

The modification degree in the modified polyvinyl alcohol having the basic structure of the formula (10) may be suitably 30 mol% or less, but preferably within the range of from 0.05 to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

Also, a modified polyvinyl alcohol which is a polymer having the recurring units represented by the following formula (11) and also having at least one —SR group (wherein R represents a hydrocarbon group or mono- or poly-hydroxy hydrocarbon group having 1 to 18 carbon atoms, and S represents sulfur atom) may also preferably be used.

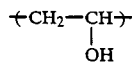  (11)

Specific examples of the modified polyvinyl alcohol having the recurring units represented by the above formula (11) are shown below.

That is, those of the following formula (11-I);

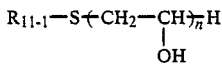  (11-I)

wherein $R_{11-1}$ is a hydrocarbon group having 1 to 18 carbon atoms, including methyl, ethyl, n-propyl, i-propyl, n-butyl, i-butyl, t-butyl, n-hexyl, n-octyl, i-octyl, n-decyl, n-dodecyl, t-dodecyl, n-tetradecyl, n-hexadecyl, n-octadecyl, and the like.

Also, specific examples of those wherein $R_{11-1}$ is mono- or poly-hydroxyhydrocarbon group may include modified polyvinyl alcohols wherein $R_{11-1}$ has hydroxyethyl and 2,3-dihydroxypropyl group.

The modification degree in the modified polyvinyl alcohol may be suitably 30 mol% or less, but preferably within the range of from 0.05 to 20 mol%. Particularly, in the present invention, 0.05 to 10 mol% is preferred. On the other hand, its polymerization degree may be 10 to 10000, preferably 10 to 2000.

Further, a modified polyvinyl alcohol having a polymerization degree of 10 to 200 and a ratio of weight-average polymerization degree to number-average polymerization degree within the range from 2.0 to 3.0 is preferred.

The modified polyvinyl alcohol may have a saponification degree of 80 mol% or more, preferably 85 mol% or more.

Further, the above modified polyvinyl alcohol resin may also be a modified polyvinyl alcohol having the structural units represented by the following formula (12):

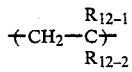  (12)

In the above formula, $R_{12-1}$ and $R_{12-2}$ each represents hydrogen atom, an alkyl group (methyl, ethyl, n-propyl, isopropyl, n-butyl, t-butyl, n-amyl, n-hexyl, n-octyl, t-octyl, etc.), an aryl group (phenyl, naphthyl, tolyl, xylyl, biphenyl, etc.), an alkyl group having aryl group, a halogen atom (F, Cl, Br, I), cyano group or a residue derived from a heterocyclic ring (pyran, thiapyran, pyridine, tetrahydropyran, tetrahydrothiapyran, imidazole, 2-methylimidazole, 2-ethylimidazole, pyridazine, pyrimidine, pyrazine, thiazole, oxazole, selenazole, pyrrolidine, thiazine, hydantoin, carbazole, benzothiazole, benzooxazole, benzimidazole, benzoselenazole, naphthothiazole, naphthooxazole, naphthoimidazole, naphthoselenazole, oxadiazole, thiazoazole, triazole, etc.).

This is obtained by saponification of a copolymer of a comonomer shown by the following formula (12-I) and vinyl acetate:

  (12-I)

(wherein $R_{12-1}$ and $R_{12-2}$ are as defined above).

Specific examples of the compound represented by the formula (12-I) may include ethylene, propylene, 1,1-dimethylethylene, butylene, 1,1-diethylethylene, styrene, phenylethylene, chloroethylene, dichloroethylene, bromoethylene, dibromoethylene, ethyleneiodide, fluoroethylene, difluoroethylene, acrylonitrile, dicyanoethylene, pyridylethylene, 4-vinyltetrahydropyran, 4-vinyltetrahydrothiapyran, 4-vinylpyran, 1-vinyl-2-methylimidazole, 1-vinyl-2-ethylimidazole, 4-vinylpyridazine, 4-vinylpyrimidine, 3-vinylpyrazine, 2-vinylthiazole, 3-vinylthiazole, 2-vinyloxazole, 1-vinylpyrrolidine, 4-vinylthiazine, 5-vinylhydantoin, 1-vinylcarbazole, etc.

Also, as the vinyl alcohol type polymer to be used in the present invention, in addition to polyvinyl alcohols having various polymerization degrees and saponification degrees, there are included not only saponified products of copolymers of vinyl esters, typically vinyl acetate, with a small amount of other polymerizable monomers (e.g. one or more of α-olefins such as ethylene, propylene, isobutylene, etc., alkyl vinyl ethers typically methyl vinyl ether, vinyl chloride, etc.), etc., but also polyvinyl alcohol type polymers such as cyanoethylated polyvinyl alcohol and others.

The modification degree in the modified polyvinyl alcohol may be suitably 50 mol% or less, but preferably within the range of from 0.05 to 30 mol%. Particularly, in the present invention, 0.05 to 20 mol% is preferred. On the other hand, its polymerization degree may be 100 to 10000 preferably 500 to 2000.

The modified polyvinyl alcohol may have a saponification degree of 80 mol% or more, preferably 85 mol% or more (saponification degree was measured by JIS K6726-1977).

The modified polyvinyl alcohol resin may also be a modified polyvinyl alcohol containing the structural units represented by the following formula (13):

$$\leftarrow CH_2-CH\rightarrow \\ | \\ OCH_2CHR_{13\text{-}1}CONHCH_2OR_{13\text{-}2}$$

(13)

(wherein $R_{13\text{-}1}$ represents hydrogen atom or methyl group, $R_{13\text{-}2}$ represents hydrogen atom or an alkyl group having 1 to 4 carbon atoms).

This class of product is synthesized by allowing a compound represented by the following formula (13-I) to react with the hydroxyl group of a vinyl alcohol type polymer in the presence of a base catalyst:

$$CH_2=CR_{13\text{-}1}CONHCH_2OR_{13\text{-}2}$$ (13-I)

(wherein $R_{13\text{-}1}$ represents hydrogen atom or methyl group, $R_{13\text{-}2}$ represents hydrogen atom or an alkyl group having 1 to 4 carbon atoms).

Specific examples of the compound represented by the formula (13-I) may include N-methylolacrylamide, N-methylolmethacrylamide, N-methoxymethylacrylamide, N-methoxymethylmethacrylamide, N-ethoxymethylmethacrylamide, N-n-propoxymethylacrylamide, N-isopropoxymethylacrylamide, N-n-butoxymethylacrylamide, N-isobutoxymethylacrylamide, etc. Among them, in view of reactivity, etc., N-methylolmethacrylamide, N-methoxymethylmethacrylamide are particularly preferred.

Also, as the vinyl alcohol type polymer to be used in the present invention, in addition to polyvinyl alcohols having various polymerization degrees and saponification degrees, there are included not only saponified products of copolymers of vinyl esters—typically vinyl acetate, with a small amount of other polymerizable monomers (e.g. one or more of α-olefins such as ethylene, propylene, isobutylene, etc., alkyl vinyl ethers typically methyl vinyl ether, vinyl chloride, etc.), etc., but also polyvinyl alcohol type polymers such as cyanoethylated polyvinyl alcohol and others.

The modification degree in the modified polyvinyl alcohol may be suitably 30 mol% or less, but preferably within the range of from 0.05 to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

Further, the modified polyvinyl alcohol may also be a modified polyvinyl alcohol containing the structural units represented by the following formula (14):

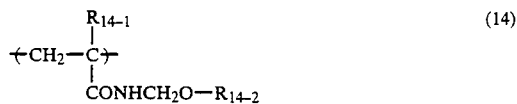

$$\leftarrow CH_2-C\rightarrow \\ \phantom{CH_2-}\underset{CONHCH_2O-R_{14\text{-}2}}{\overset{R_{14\text{-}1}}{|}}$$

(14)

(wherein $R_{14\text{-}1}$ represents hydrogen atom or methyl group, and $R_{14\text{-}2}$ represents an alkyl group having 1 to 4 carbon atoms).

This is obtained by saponifying a copolymer of vinyl acetate and a comonomer represented by the following formula (14-I):

$$CH_2=CR_{14\text{-}1}-CONHCH_2O-R_{14\text{-}2}$$ (14-I)

(wherein $R_{14\text{-}1}$ represents hydrogen atom or methyl group, and $R_{14\text{-}2}$ represents an alkyl group having 1 to 4 carbon atoms).

Specific examples of the comonomer may include N-methoxymethlacrylamide, N-methoxymethylmethacrylamide, N-ethoxymethylacrylamide, N-ethoxymethylmethacrylamide, N-n-propoxymethylacrylamide, N-n-propoxymethylmethacrylamide, N-isopropoxymethylacrylamide, N-isopropoxymethylmethacrylamide, N-n-butoxymethylacrylamide, N-n-butoxymethylmethacrylamide, N-isobutoxymethylacrylamide, N-isobutoxymethylmethacrylamide, N-tert-butoxymethylacrylamide, N-tertbutoxymetylmethacrylamide, etc.

The modification degree in the modified polyvinyl alcohol may be uistably 30 mol% or less, but preferably within the range of from 0.05 to 20 mol%. Particularly, in the present invention, 0.05 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

The modified polyvinyl alcohol resin may also be a modified polyvinyl alcohol containing the structural units represented by the following formula (15):

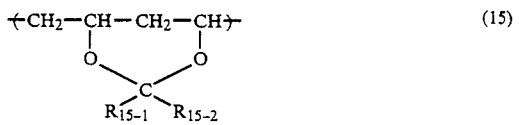

(wherein $R_{15\text{-}1}$ and $R_{15\text{-}2}$ each represents hydrogen atom, an alkyl group, an aryl group a lower alkyl group having aryl group, an allyl group or an alkynyl group, or a cyclic saturated hydrocarbon group formed by cyclization of $R_{15\text{-}1}$ and $R_{15\text{-}2}$).

This is synthesized by reacting a compound represented by the following formula (15-I) with the hydroxyl group of a vinyl alcohol type polymer in the presence of a base catalyst.

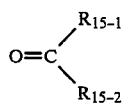
(15-I)

(wherein $R_{15-1}$ and $R_{15-2}$ each represents hydrogen atom, an alkyl group, an aryl group, a lower alkyl group having aryl group, an allyl group in an alkynyl group, or a cyclic saturated hydrocarbon group formed by cyclization of $R_{15-1}$ and $R_{15-2}$).

Specific examples of the compound represented by the formula (15-1) may include formaldehyde, acetaldehyde, propionaldehyde, butylaldehyde, isobutylaldehyde, valeraldehyde, isovaleraldehyde, pivalinaldehyde, capronaldehyde, heptoaldehyde, caprylaldehyde, pelargonaldehyde, caprinaldehyde, undecylaldehyde, laurinaldehyde, tridecylaldehyde, myristinaldehyde, pentadecylaldehyde, palmitinaldehyde, margarinaldehyde, stearinaldehyde, acrolein, crotonaldehyde, propiolaldehyde, benzaldehyde, o-tolaldehyde, m-tolaldehyde, p-tolaldehyde, salicylaldehyde, cinnamaldehyde, α-naphthoaldehyde, β-naphthoaldehyde, p-nitrobenzaldehyde, m-nitrobenzaldehyde, o-nitrobenzaldehyde, p-chlorobenzaldehyde, m-chlorobenzaldehyde, o-chlorobenzaldehyde, 2,4-chlorobenzaldehyde, 2,6-dichlorobenzaldehyde, p-fluorobenzaldehyde, m-fluorobenzaldehyde, o-fluorobenzaldehyde, p-bromobenzaldehyde, m-bromobenzaldehyde, o-bromobenzaldehyde, cyclohexanone, etc.

Also, as the vinyl alcohol type polymer to be used in the present invention, in addition to polyvinyl alcohols having various polymerization degrees and saponification degrees, there are included not only saponified products of copolymers of vinyl esters, typically vinyl acetate, with a small amount of other polymerizable monomers (e.g. one or more of α-olefins such as ethylene, propylene, isobutylene, etc., alkyl vinyl ethers typically methyl vinyl ether, vinyl chloride, etc.), etc., but also polyvinyl alcohol type polymers such as cyanoethylated polyvinyl alcohol and others.

The modification degree in the modified polyvinyl alcohol may be suitably 80 mol% or less, but preferably within the range of from 0.05 to 50 mol%. Particularly, in the present invention, 0.05 to 20 mol% is preferred. On the other hand, its polymerization degree may be 100 to 10000 preferably 500 to 2000.

The modified polyvinyl alcohol may have a saponification degree of 80 mol% or more, preferably 85 mol% or more.

Further, the modified polyvinyl alcohol to be used in the alignment control film 14a and 14b may be a boron-containing polyvinyl alcohol.

Specifically, a polymer having the structural units represented by the following formula (16) may be included:

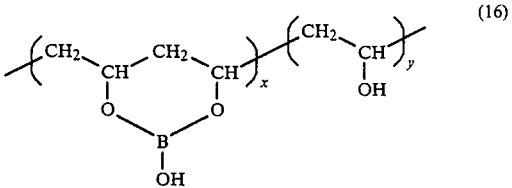

(wherein x/(x+y) (mol%) is 0.01 to 30 mol%, preferably 1 to 20 mol%).

The modification degree in the modified polyvinyl alcohol resin containing boron may be suitably 30 mol% or less, but preferably within the range of from 1 to 20 mol%. Particularly, in the present invention, 1 to 10 mol% is preferred. On the other hand, its polymerization degree may be 100 to 10000, preferably 500 to 2000.

The modified polyvinyl alcohol may have a saponification degree of 80 mol% or more, preferably 85 mol% or more.

The alignment control films 14a and 14b are formed of these modified polyvinyl alcohols and they can have the function as insulating films, and they are generally formed with a film thickness ranging generally from 50 Å to 1μ, preferably from 100 to 2000 Å, more preferably from 500 to 2000 Å.

As the method for forming the film of these modified polyvinyl alcohols, it is possible to use a method in which a solution having the modified polyvinyl alcohol resin dissolved in an appropriate solvent at a proportion of 0.1 wt.% to 20 wt.%, preferably 0.2 to 10 wt.% or a solution of a precursor thereof is applied according to apinner coating, dip coating, screen printing, spray coating or roll coating, and then cured under predetermined curing conditions (e.g., heating).

The solvent to be used in this case may include water, glycol glycerol, piperazine, triethylenediamine, formaldehyde, dimethylformaldehyde, etc.

Next, a ferroelectric liquid crystal having an arrangement of molecules forming a plurality of layers perpendicular to the faces of a pair of parallel substrates to be used in the liquid crystal device of the present invention is to be explained.

FIG. 2 illustrates schematically an example of a ferroelectric liquid crystal cell by use of a helical structure. Substrates (glass plates) 21a and 21b are coated with transparent electrodes of $In_2O_3$, $SnO_2$ or ITO (Indium Tin Oxide), etc., and a liquid crystal of SmC* (chiral smectic C phase) is hermetically disposed therebetween so that a plurality of liquid crystal molecular layers 22 are aligned perpendicular to the glass substates. Full lines 23 show liquid crystal molecules each having a dipole moment (P⊥) 24. A half of the apex angle of the cone at this time represents the tilt angle ⊕ in the chiral smectic phase of such a helical structure. When a voltage above a certain threshold value is applied between the electrodes on the substrates 21a and 21b, the helical structure of the liquid crystal molecules 23 is unwound to orient the liquid crystal molecules 23 so that all the dipole moments (P⊥) 24 may be directed in the electrical field direction.

However, the ferroelectric liquid crystal by use of the helical structure is restored to the original helical structure under no application of electrical field, and it does not exhibit bistability as described below.

In a preferable example of the present invention, it is possible to use a ferroelectric liquid crystal device having at least two stable states in the absence of an electrical field, particularly having the bistable state as shown in FIG. 3. That is, when the thickness of the liquid crystal cell is made sufficiently thin (e.g. 1μ), the helical structure of the liquid crystal molecules will be unwound even under no application of electrical field to become a no helical structure as shown in FIG. 3, whereby its dipole moment assumes either Pa directed upward (34a) or Pb directed downward (34b), thus forming a bistable state. When an electrical field Ea or Eb with different polarity of a certain threshold value or higher is applied to such a cell as shown in FIG. 3, the dipole moment will change its direction upwardly 34a or downwardly 34b corresponding to the electrical field vector Ea or Eb, whereby the liquid crystal molecules become oriented to either one of the first stable state 33a or the second stable state 33b, correspondingly. A half of the angle formed between the first and second stable states corresponds to a tilt angle $\theta$.

Use of such a ferroelectric liquid crystal as the optical modulating device gives the following two advantages. Firstly, the response speed is extremely rapid and secondly alignment of the liquid crystal molecules has bistability. To describe about the second point by referring to, for example, FIG. 3, application of an electrical field Ea makes liquid crystal molecules oriented to the first stable state 33a, which is stably retained even if the electrical field is removed. On the other hand, when an electrical field Eb in the opposite direction is applied, the liquid crystal molecules are oriented to the second stable state 33b to change the directions of the molecules, which state is also stably retained even if the electrical field is removed. Also, unless the electrical field Ea or Eb given exceeds a certain threshold value, the respective alignment states are also maintained. For such rapid response speed and memory effect through bistability to be realized effectively, the cell should be preferably as thin as possible, generally 0.5 to 20μ, particularly 1 to 5μ. A liquid crystal-electooptical device having a matrix electrode structure by use of this kind of ferroelectric liquid crystal is proposed by, for example, Clark and Lagerwall in U.S. Pat. No. 4,367,924.

Examples of the ferroelectric liquid crystals which can be used in the liquid crystal device of the present invention may include p-declyoxybenzylidene-p'-amino-2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamte (TDOBAMBCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4,4'-azoxycinnamic acid-bis(2-methylbutyl)ester, 4-O-(2-methyl)butylresorcylidene-4'-octylaniline, 4-(2'-methylbutyl)phenyl-4'-octyloxybiphenyl-4-carboxylate, 4-hexyloxyphenyl-4-(2''-methylbutyl)biphenyl-4'-carboxylate, 4-octyloxyphenyl-4-(2''-methylbutyl)biphenyl-4'-carboxylate, 4-heptylphenyl-4-(4''-methylhexyl)biphenyl-4'-carboxylate, 4-(2''-methylbutyl)phenyl-4-(4''-methylhexyl)biphenyl-4'-carboxylate, etc. These can be used either alone or as a combination of two or more kinds, and it is also possible to incorporate other cholesteric liquid crystals or smectic liquid crystals within the range exhibiting ferroelectricity.

Also, in the present invention, the ferroelectric liquid crystal may be used in a chiral smectic phase, typically chiral smectic C phase (SmC*), H phase (SmH*), I phase (SmI*), K phase (SmK*) or G phase (SmG*).

Figure 4:
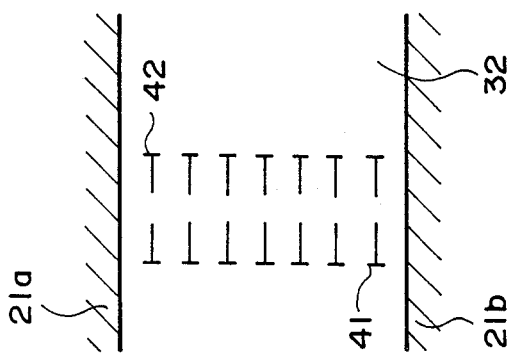
FIG. 4 is a sectional view showing schematically a uniform alignment state.
Figure 6:
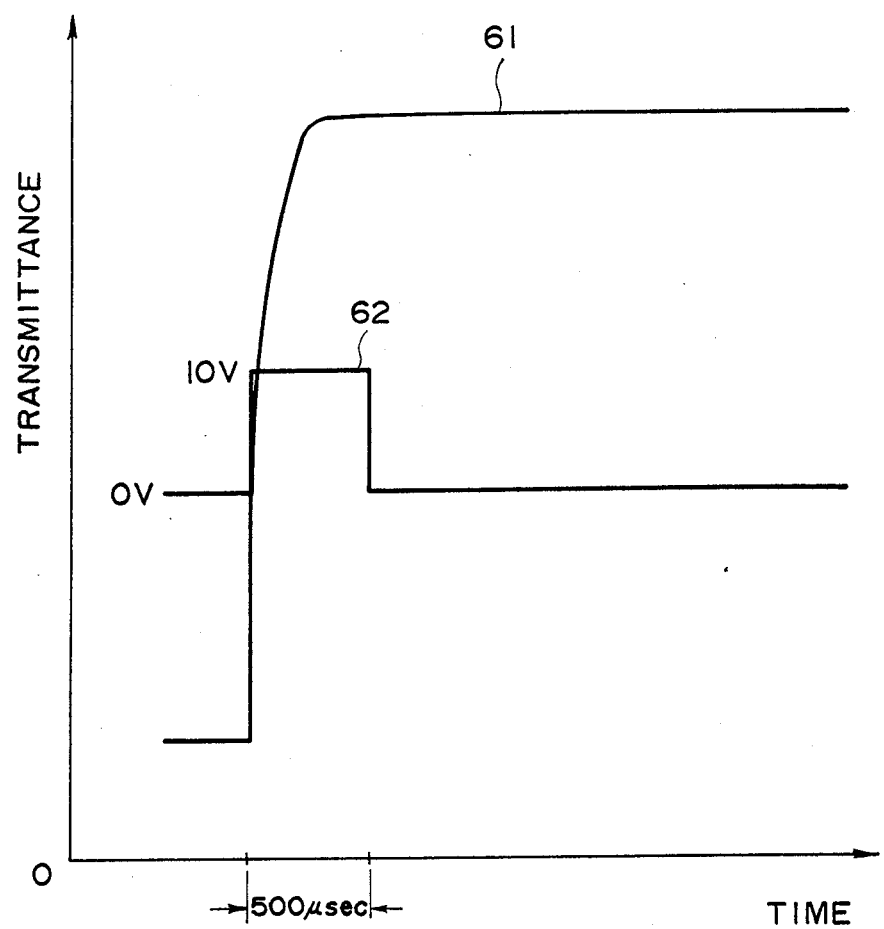
FIG. 6 is a characteristic graph showing an optical responsive characteristic under a uniform alignment state.

FIG. 4 is a sectional view showing schematically the uniform alignment state during no application of voltage of the ferroelectric liquid crystal device, and FIG. 6 represents optical response characteristic to pulse signals under such state. This is, FIG. 4 is a sectional view as viewed in the direction normal to the vertical layers 32 formed on a plurality of chiral smectic liquid crystal molecules shown in FIG. 3. Reference numeral 41 in FIG. 4 shows a projection (C-director) of the liquid crystal molecules 33a or 33b shown in FIG. 3 onto the perpendicular layers 32 as mentioned above, and reference numeral 42 shows the tip of liquid crystal molecules 33a or 33b relative to the perpendicular layer 32 as mentioned above. Thus, according to FIG. 4, the liquid crystal molecules within a perpendicular layer 32 are aligned in substantially parallel to each other, whereby the tilt angle $\theta$ can be made approximate to the maximum tilt angle ⊕. This state is called a uniform alignment state.

In contrast, FIG. 5 shows an arrangement of liquid crystal molecules within a perpendicular layer 32 in the same manner as in FIG. 4. As can be seen from FIG. 5, the tips 42 of the liquid crystal molecules 41 within the perpendicular layer 32 rotate along the circumference in the direction of the liquid crystal layer. Thus, the liquid crystal molecules adjacent to the substrate 21a and 21b are not in parallel to each other, but the liquid crystal molecules within the perpendicular layer 32 are aligned under continuously twisted state from the substrate 20a toward 21b. Such alignment state is called a splay alignment state.

Figure 7:
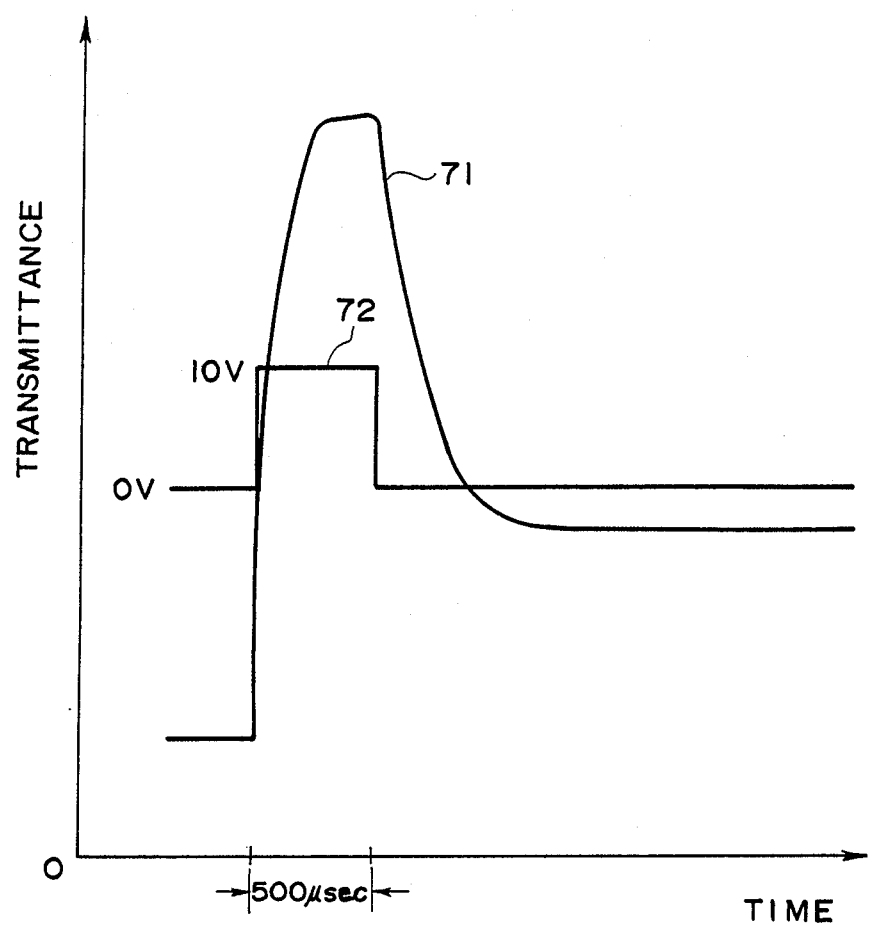
FIG. 7 is a characteristic graph showing an optical responsive characteristic under a splay alignment state.

It has been found that the splay alignment state, while it is converted into the uniform alignment state shown in FIG. 4 under application of a certain voltage, returns to the splay alignment state shown in FIG. 5, when the applied voltage is once removed to form the memory state. Accordingly, in the splay alignment state, optical characteristics of high transmittance based on the uniform alignment state can be exhibited under application of a voltage as shown in FIG. 7, but under no application of voltage, the alignment state returns to the original splay alignment state with a small tilt angle $\theta$, to give optical characteristics of a low transmittance based on such a state.

In contrast, in the uniform alignment state shown in FIG. 4, since no splay alignment as described above is involved, a high transmittance characteristic during application of a voltage can be maintained as such even under a memory state in the absence of an applied voltage.

More specifically, FIG. 6 shows a transmittance curve 61 when a pulse 62 with a voltage of 10 V and a pulse duration of 500 μsec is applied, and it can be seen that the transmittance obtained under the pulse application is maintained even under a memory state at a voltage of 0 V. FIG. 7 shows the transmittance curve 71 when the same pulse 72 of a voltage 10 V and a pulse duration 500 μsec is applied. According to this transmittance curve 71, the transmittance becomes high during application of the pulse, so that flickering is caused during driving. Further, under the memory state of a zero voltage, the transmittance is abruptly lowered to provide a dark display picture.

In a preferable example of the present invention, an AC application pre-treatment is effective to have the ferroelectric liquid crystal assume the uniform alignment state shown in FIG. 4. By the AC application pre-treatment, the tilt angle $\theta$ as mentioned above can be increased up to the tilt angle Ⓗ in the helical structure or to a level approximate thereto. The AC used for this purpose may have a voltage of 20 to 500 V, preferably 30 to 150 V and a frequency of 10 to 500 Hz, preferably 10 to 200 Hz, and the AC application pre-treatment can be applied for a time of several seconds to about 10 minutes. Also, such AC application pretreatment may be practiced, for example, at a stage before writing operation performed corresponding to picture signals or information signals in a liquid crystal device. Preferably, the above-mentioned AC application pretreatment may be occur during a waiting period after such a liquid crystal device is assembled in an apparatus and before such apparatus is operated, or alternatively the AC application pretreatment can be applied also during manufacturing of such a liquid crystal device.

Such AC application pretreatment can make the tilt angle $\theta$ before application increased to an angle approximate to the tilt angle Ⓗ in the helical structure, and yet the increased tilt angle can be maintained even after such AC application is terminated.

Also, such AC application pre-treatment is effective for a ferroelectric liquid crystal with a large spontaneous polarization (e.g., 5 nC/cm$^2$ or more, preferably 10 nC/cm$^2$–300 nC/cm$^2$ at 25° C.; nC represents a unit nanocoulomb). This spontaneous polarization can be measured with a 100$\mu$ cell according to the triangular wave application method according to "Direct Method with Triangular Waves for Measuring Spontaneous Polarization in Ferroelectric Liquid Crystal" by K. Miyasato, et. al., in Japanese Journal of Applied Physics, Vol. 22(10), p. 661–663 (1983).

The present invention is described below by referring to specific Examples and Comparative Examples, in which "parts" represent parts by weight.

EXAMPLE 1-1

Two sheets of 0.7 mm-thick glass plates were prepared and an ITO film was formed on each glass plate. Each glass plate provided with the ITO film was coated with an aqueous solution containing a silicon-containing polyvinyl alcohol dissolved at proportion of 2 wt.% dissolved therein by a spinner rotating at 2000 rpm for 15 seconds. After film formation, heating treatment was applied at 180° C. for about 1 hour. The coating at this time had a thickness of about 200 Å.

Silicon-containing polyvinyl alcohol

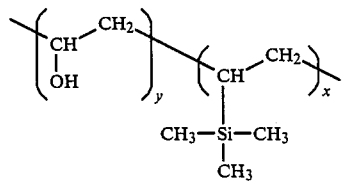

| Polymerization degree: | 1750 |
| Saponification degree: | 98.2 mol % |
| x/(x + y) mol %: | 15 mol % |

The coating after heating was subjected to rubbing treatment with an acetate fiber cloth, then washed with an isopropyl alcohol solution, and after alumina beads of a mean-particle size of about 1 $\mu$m were sprayed on one of the glass plates, the two glass plates were superposed on one another so that the rubbing treated axes became parallel to each other to prepare a cell.

The cell thickness of the cell was measured by means of Berek compensator (i.e., measurement by phase differece) to be about 1 $\mu$m. After the injection under vacuum of an ester-type ferroelectric liquid crystal mixture ("CS-1011" (trade name) produced by Chisso K.K.) into the cell under isotropic phase, the ferroelectric liquid crystal could be aligned by cooling gradually from isotropic phase to 60° C. at a rate of 0.5° C./h. Experiments were thereafter conducted at 60° C.

The phase transition characteristics of "CS-1011" as mentioned above were as follows.

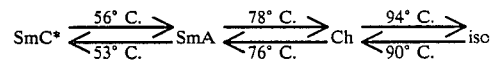

(SmA: smectic A phase, Ch: cholesteric phase, Iso: isotropic phase).

When the cell was observed under crossed nicols, a monodomain of a chiral smectic C phase with a uniform and defectless non-helical structure was found to be obtained.

Next, a high electrical field AC voltage of 70 volt and a frequency of 70 Hz was applied to the liquid crystal cell as described above for about 1 minute (AC application pre-treatment) . The tilt angle $\theta$ at this time was measured to be 18°.

A tilt angle $\theta$ is generally measured by applying a pulse electrical field (10 V; 500 $\mu$sec) to a liquid crystal cell to orient the liquid crystal molecules to one stable state and observe the position providing the darkest state where the amount of transmitted light becomes the lowest while rotating the liquid crystal cell under cross nicols, and then applying a pulse electrical field of the opposite polarity to the previous pulse ($-10$ V; 500 $\mu$sec) to transform the liquid crystal molecules to another stable molecular orientation state which provides a bright state and observing again an angle for providing the darkest state by rotating the liquid crystal cell. The positions for the two darkest states correspond to two stable average molecular axes of the liquid crystal and the angle between the two states corresponds to 2$\theta$, i.e., twice the tilt angle $\theta$.

The liquid crystal cell of this example was found to maintain the tilt angle 18° over a period of one week or longer.

Also, when the liquid crystal device of this example was subjected to multiplexing drive under the driving conditions shown below, a display picture free of flickering was found to be formed.

Driving conditions:
(1) First step: A signal of pulse duration of 500 $\mu$sec and voltage of 10 V was applied to all scanning lines and a signal of pulse duration of 500 $\mu$sec and voltage of $-5$ V applied to all signal lines at one time.
(2) Second step: A scanning selection signal of pulse duration of 500 $\mu$sec and voltage of 10 V was sequentially applied to the scanning lines and, in phase with the scanning selection signal, a signal of pulse duration of 500 $\mu$sec and voltage of 5 V and a signal of pulse duration of 500 $\mu$sec and voltage of $-5$ V were applied selectively to the signal lines.

EXAMPLES 1-2 TO 1-20

Liquid crystal cells were prepared according to entirely the same method as in Example 1-1 except for changing the silicon-containing polyvinyl alcohol resin used in preparation of the liquid crystal cell of Example 1-1 to modified polyvinyl alcohol resins shown in the following Tables 1-1 to 1-3, and the same AC application pre-treatment as in Example 1-1 was practiced. The tilt angle $\theta$ at that time and the tilt angle $\theta$ after standing for one week were measured. These results are shown in Tables 1-1 to 1-3 ("PVA" in the Tables represents polyvinyl alcohol).

TABLE 1-1

| | Silicon-containing polyvinyl alcohol of the formula (1a) | | | | | | |
|---|---|---|---|---|---|---|---|
| | Silicon-containing PVA of the formula (1a) | | | | | Tilt angle | Tilt angle after |
| Example | $R_{1a-1}$ | $R_{1a-2}$ | Polymerization degree | Saponification degree mol % | $\frac{x}{x+y}$ mol % | as prepared ($\theta$) | standing for 1 week after AC application ($\theta$) |
| 1-2 | —CH$_3$ | —CH$_3$ | 1800 | 96.5 | 11 | 17.5° | 16.5° |
| 1-3 | —CH$_3$ | —CH$_3$ | 2000 | 98.5 | 8 | 18° | 18° |
| 1-4 | —C$_2$H$_5$ | —C$_2$H$_5$ | 1700 | 95.0 | 12 | 18° | 17° |
| 1-5 | —CH$_3$ | —C$_2$H$_5$ | 850 | 92.5 | 7 | 17.5° | 17.5° |

TABLE 1-2

| | Silicon-containing polyvinyl alcohol of the formula (1b) | | | | | |
|---|---|---|---|---|---|---|
| | Silicon-containing PVA of the formula (1b) | | | | Tilt angle | Tilt angle after |
| Example | $R_{1b}$ | Polymerization degree | Saponification degree mol % | $\frac{x}{x+y}$ mol % | as prepared ($\theta$) | standing for 1 week after AC application ($\theta$) |
| 1-7 | —CH$_3$ | 1850 | 92.3 | 15 | 17.5° | 16.5° |
| 1-8 | —CH$_3$ | 1900 | 93.0 | 8 | 17.5° | 17.5° |
| 1-9 | —CH$_3$ | 1750 | 96.0 | 7 | 18° | 18° |
| 1-10 | —C$_2$H$_5$ | 1750 | 96.5 | 7 | 18° | 18° |

TABLE 1-3

| | Silicon-containing polyvinyl alcohol of the formula (1c) | | | | | | | | | |
|---|---|---|---|---|---|---|---|---|---|---|
| | Silicon-containing PVA of the formula (1c) | | | | | | | | Tilt angle | Tilt angle after |
| Example | $X_{1c}$ | $Y_{1c}$ | $Z_{1c}$ | $W_{1c}$ | q1 | Polymerization degree | Saponification degree mol % | $\frac{x}{x+y}$ mol % | as prepared ($\theta$) | standing for 1 week after AC application ($\theta$) |
| 1-11 | —CH$_3$ | —OCH$_3$ | —OCH$_3$ | — | 0 | 1750 | 98.5 | 8 | 16.5° | 16.5° |
| 1-12 | —OCH$_3$ | —OCH$_3$ | —OH | — | 0 | 1850 | 96.7 | 11 | 17° | 16° |
| 1-13 | —OCH$_3$ | —OCH$_3$ | —OCH$_3$ | —O— | 1 | 1700 | 92.8 | 7 | 18° | 18° |
| 1-14 | —CH$_3$ | —CH$_3$ | —OCH$_3$ | —CH$_2$ | 1 | 1750 | 93.5 | 16 | 18° | 16° |
| 1-15 | —CH$_3$ | —CH$_3$ | —OCH$_3$ | —CH$_2$ | 1 | 1800 | 96.5 | 8 | 18° | 18° |
| 1-16 | —C$_2$H$_5$ | —OCH$_3$ | —OCH$_3$ | — | 0 | 1750 | 95.5 | 7 | 17.5° | 17.5° |
| 1-17 | —C$_3$H$_7$ | —OC$_2$H$_5$ | —OC$_2$H$_5$ | — | 0 | 1750 | 96.0 | 7 | 17.5° | 17° |
| 1-18 | —CH$_3$ | —OCH$_3$ | —OCH$_3$ | —OCH$_2$ | 1 | 1850 | 94.5 | 6 | 18° | 18° |
| 1-19 | —CH$_3$ | —OCH$_3$ | —OCH$_3$ | —O—CH$_2$—O— | 1 | 1700 | 93.0 | 10 | 17.5° | 17° |
| 1-20 | —CH$_3$ | —CH$_3$ | OH | —O—CH$_2$—O— | 1 | 1800 | 96.6 | 9 | 17.5° | 17.5° |

By using the perspective liquid crystal cells prepared as above, a display was performed by multiplexing drive similarly as described in Example 1-1. As a result, there was no flockering caused during writing in every case even one week after the AC application pre-treatment.

EXAMPLE 2-1

46.5 parts of vinyl acetate, 2.4 parts of dimethylchlorohydrosilane (Me$_2$Si(Cl)H), 0.27 part of azobisisobutyronitrile and 50 parts by volume of benzene were charged into a polymerization tube, the tube was sealed after replacement with nitrogen and heat-polymerization was carried out under stirring at 60° C. for 6 hours.

After completion of the polymerization, benzene, unreacted vinyl acetate and dimethylchlorohydrosilane were removed by vacuum distillation of the solution in the polymerization tube, whereby 10 parts of a polymer were obtained. As the result of GPC analysis, its polymerization degree was found to be 128.

The polymer was dissolved in 100 parts by volume of dry benzene and 48 parts of terminal sodium silanolate of polydimethylsiloxane (NaO$\leftarrow$Me$_2$.SiO$\rightarrow$$_{18}$Na) and 150 parts by volume of dry benzene were added thereto. After stirring at room temperature for 1 hour, the reaction was carried out and subsequently 10 parts by volume of trimethylchlorosilane (Me$_3$SiCl) were added, and further the mixture was stirred for 1 hour. The reaction mixture was filtered to remove NaCl formed, and then the filtrate was heated to evaporate benzene and thereafter the residual polymer was extracted and washed with n-hexane to remove the polydimethylsiloxane homopolymer by extraction, followed by drying to obtain 12 parts of a residual polymer.

To 50 parts of a 20% tetrahydrofuran solution of the thus obtained polyvinyl acetate-polydimethylsiloxane block copolymer were added 30 parts of methyl alcohol, and the mixture was maintained at 40° C. and 8.3 parts of a 20% methanol solution of sodium methylate was added to this solution. The polymer precipitated after standing for a 60 minutes was separated, neutralized with methanol containing acetic acid, then washed well with methanol and dried at 60° C. for 5 hours to give 5.3 parts of a polyvinyl alcohol modified with polysiloxane represented by the following formula (2-IV).

$$\text{+Si(Me)(Me)-O+}_{18}$$ (2-IV)

| | |
|---|---|
| Polymerization degree: | 12000 |
| Saponification degree: | 97.7 mol % |
| Modification degree: | 14 mol %. |

By use of the modified polyvinyl alcohol as the alignment film, a liquid crystal device was prepared.

A liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pre-treatment was effected in the same manner as in Example 1-1. The tilt angle $\theta$ at that time and the tilt angle $\theta$ after standing for 1 week were measured. These results are shown in Table 2-1 appearing hereinafter.

EXAMPLE 2-2

95 parts of vinyl acetate, 5 parts of diphenyl hydrochlorosilane, 0.4 part of benzoyl peroxide and 50 parts of tetrahydrofuran were charged into a polymerization tank and, after replacement with nitrogen, heating polymerization was carried out under stirring in a nitrogen atmosphere at 30° C. for 5 hours.

After a predetermined period of time, tetrahydrofuran, unreacted vinyl acetate and diphenyl hydrochlorosilane were removed by vacuum distillation of the contents in the polymerization tank, whereby 18 parts of a polymer were obtained. As the result of GPC analysis, its polymerization degree was found to be 245.

After 10 parts of the polymer were dehydrated and dried, it was dissolved in 100 parts of tetrahydrofuran, and to the resultant solution, 10 parts of a dry tetrahydrofuran solution containing 0.56 part of a polydiphenylsiloxane potassium silanolate at both terminals of the following formula was added dropwise under stirring at 40° C.:

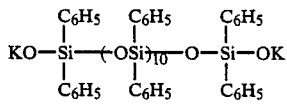

After completion of the dropwise addition, the mixture was further stirred at 40° C. for 2 hours. After the crystals formed were separated by filtration of the reaction mixture, the filtrate was evaporated by heating to remove tetrahydrofuran to give 10.5 parts of a residual solid polymer. A 20% solution of the block copolymer of polyphenylsiloxane and polyvinyl acetate in a 5:1 mixture of methyl alcohol and methyl acetate was prepared and heated to 35° C. To 20 parts of the solution was added 0.3 part by volume of 1N sodium hydroxide methanolic solution, and the mixture was stirred well. After the system was solidified by gelation, the gel was pulverized. After the powder was neutralized by immersing in methanol containing acetic acid, it was washed well with methanol. The powder was dried to give 2.2 parts of a polyvinyl alcohol modified with the polysiloxane represented by the following formula (2-V):

$$\text{+Si(Ph)(Ph)-O+}_{12}$$ (2-V)

| | |
|---|---|
| Polymerization degree: | 44000 |
| Saponification degree: | 89 mol % |
| Modification degree: | 4 mol % |

By use of the modified polyvinyl alcohol as the alignment film, a liquid crystal device was prepared according to the same operation as in Example 1-1.

To the liquid crystal cell prepared, a high electrical field AC at a voltage of 70 V and a frequency of 70 Hz was applied similarly as in Example 1-1 for about 1 minute (AC application pre-treatment). The tilt angle $\theta$ at this time was measured. Also, the tilt angle $\theta$ after standing for one week was measured. These results are shown in Table 2-1. There was no flickering during writing.

EXAMPLE 2-3

50 parts of vinyl acetate, 1.5 parts of diethylchlorohydrosilane ($(C_2H_5)_2Si(Cl)H$ and 0.2 part of 2,2'-azobis-2,4-dimethylvaleronitrile were charged into a polymerization tank and, after replacement with nitrogen, heating polymerization was carried out under stirring at 55° C. for 3 hours.

After completion of the polymerization, unreacted vinyl acetate and dichlorohydrosilane were evaporated under vacuum to give 12 parts of a polymer. The polymer was found to have a polymerization degree of 405 and diethylchlorosilane at the terminal end. The polymer was dissolved in 100 parts of dehydrated toluene. The polymer solution was added dropwise under stirring into 200 parts of a toluene solution containing 90 parts of a polydimethylsiloxane sodium-silanolate at both terminals (polymerization degree 350). After completion of the dropwise addition, stirring was continued at 30° C. for 2 hours and 5 parts of a toluene solution containing 1 part of trimethylchlorosilane were added, followed further by stirring for 1 hour.

The filtrate obtained by filtering the crystals precipitated was subjected to vacuum evaporation, and the residual polymer was washed with petroleum ether and the polymer was dried. As the result, 15 parts of a polymer were obtained.

A 20% dioxane solution of the polymer was prepared and to 50 parts of the solution were added 10 parts of 0.5% solution of sodium hydroxide in methyl alcohol, followed by stirring for 30 minutes. The polymer precipitated was filtered, washed well with 5% water containing methyl alcohol, further washed well with methyl alcohol, followed by drying to give 7 parts of a polyvinyl alcohol modified with the polysiloxane represented by the following formula (2-VI):

$$\text{+Si(Ph)(Ph)-O+}_{350}$$ (2-VI)

| | |
|---|---|
| Polymerization degree: | 60000 |
| Saponification degree: | 98.5 mol % |

| | -continued |
|---|---|
| Modification degree: | 45 mol % |

By use of the modified polyvinyl alcohol as the alignment film, a liquid crystal device was prepared according to the same operation as in Example 1-1.

To the liquid crystal cell prepared a high eleectrical field AC at a voltage of 70 V and a frequency of 70 Hz was applied similarly as in Example 1-1 for about 1 minute (AC application pre-treatment). The tilt angle $\theta$ at this time was measured. Also, the tilt angle $\theta$ after standing for one weak was measured. These results are shown in Table 2-1 below. There was no flickering during writing.

TABLE 2-1

| Example | Tilt angle ($\theta$) as prepared | Tilt angel ($\theta$) after standing 1 week after AC application |
|---|---|---|
| 2-1 | 18° | 18° |
| 2-2 | 18.5° | 18° |
| 2-3 | 18° | 17.5° |

EXAMPLE 3-1

Into a reaction tank, 2800 parts of vinyl acetate, 400 parts of methanol and 63 parts of vinyl triacetoxysilane were charged and, after replacement of the system with nitrogen, heated to 60° C.

Into this system were added 300 parts of a methanol solution containing 7.84 parts of 2,2'-azobisisobutylonitrile to initiate polymerization.

During 4 hours of the reaction time, 355 parts of a methanol solution containing 177 parts of vinyltriacetoxysilane were added dropwise. After unreacted vinyl acetate monomer was expelled by introduction of methanol vapor, a 35% methanol solution of the copolymer was obtained. While 300 parts of the methanol solution was stirred at 40° C., 16 parts of a methanol solution containing 1.6 parts of a NaOH were added to carry out saponification reaction.

The copolymer formed by this reaction was pulverized and washed to obtain a polyvinyl alcohol modified with the copolymer units represented by the following formula (3-II) in the form of white powdery polymer.

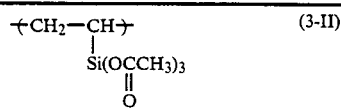

| Polymerization degree: | 1250 |
|---|---|
| Saponification degree: | 99.2 mol % |

| | -continued |
|---|---|
| Modification degree: | 5 mol % |

By use of the modified polyvinyl alcohol as the alignment film, a liquid crystal device was prepared.

A liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pretreatment was effected in the same manner as in Example 1-1. The tilt angle $\theta$ at that time and the tilt angle $\theta$ after standing for 1 week were measured. These results are shown in Table 3-1.

TABLE 3-1

| Example | Tilt angle ($\theta$) when prepared | Tilt angel ($\theta$) after standing 1 week after AC application |
|---|---|---|
| 3-1 | 18.0° | 18.0° |

EXAMPLES 3-2 TO 3-5

Modified polyvinyl alcohols were synthesized and liquid crystal cells are prepared according to entirely the same method as in Example 3-1 except for changing the comonomer vinyltriacetoxysilane used when synthesizing the modified polyvinyl alcohol of Example 3-1 to vinylacyloxysilane, and the same AC application pre-treatment as in Example 3-1 was effected.

The tilt angle $\theta$ at that time and the tilt angle $\theta$ after standing for one week were measured. These results are shown in Table 3-2.

TABLE 3-2

| | | Silicon containing modified PVA | | | | |
|---|---|---|---|---|---|---|
| Example | Vinyl silane used for copolymerization | Polymerization degree | Saponification degree mol % | Modification degree mol % | Tilt angle as prepared ($\theta$) | Tilt angle after standing for 1 week after AC application ($\theta$) |
| 3-2 | Isopropenyltriacetoxysilane | 1750 | 96.5 | 11 | 19.5° | 17.0° |
| 3-3 | Vinylisobutyldiacetoxysilane | 1900 | 97.0 | 10 | 20.0° | 20.0° |
| 3-4 | Vinyldimethylacetoxysilane | 1700 | 96.0 | 12 | 21.5° | 21.0° |
| 3-5 | Vinylmonochlorodiacetoxysilane | 1500 | 98.5 | 8 | 18.5° | 18.0° |

By use of these respective liquid crystal cells, a display was performed by multiplexing drive similarly as described in Example 1-1. As the result, there was no flickering during writing in every case even one week after the AC application pre-treatment.

EXAMPLE 4-1

Into a reaction tank, 1400 parts of vinyl acetate, 1000 parts of methanol and 48.5 parts of vinyltriethoxysilane were charged and, after replacement of the system with nitrogen, heated to 60° C.

Into this system were added 1142 parts of a methanol solution containing 42 parts of 2,2'-azobisisobutylonitrile to initiate polymerization.

During 5 hours of the reaction time, 101 parts of a methanol solution containing 10.0 parts of vinylethoxysilane were added dropwise. After unreacted vinyl acetate monomer was expelled by introduction of methanol vapor, a 50% methanol solution of the copolymer was obtained. While 100 parts of the methanol solution were stirred at 40° C., 7 parts of a methanol solution containing 0.7 parts of NaOH were added to carry out saponification reaction.

The copolymer formed by this reaction was pulverized and washed to obtain a polyvinyl alcohol modified with the copolymer units represented by the following formula (4-II) in the form of a white powdery polymer.

$$\begin{array}{c} +CH_2-CH+ \\ | \\ Si(OC_2H_5)_3 \end{array} \quad (4\text{-II})$$

| | |
|---|---|
| Polymerization degree: | 1500 |
| Saponification degree: | 98 mol % |
| Modification degree: | 8 mol % |

A liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pretreatment was practiced in the same manner as in Example 1-1.

The tilt angle θ at that time was measured to be 18°. Also, the title angle 18° was found to be maintained over a term of one week or longer.

EXAMPLES 4-2 TO 4-6

Modified polyvinyl alcohols were synthesized and liquid crystal cells were prepared according to entirely the same method as in Example 4-1 except for changing the comonomer vinyltriethoxysilane used when synthesizing the modified polyvinyl alcohol of Example 4-1 to vinylsilanes, and the same AC application pretreatment as in Example 4-1 was effected.

The tilt angle θ at that time and the tilt angle θ after standing for one week were measured. These results are shown in Table 4-1.

Into this system were added 200 parts of a methanol solution containing 1.89 parts of 2,2'-azobisisobutylonitrile to initiate polymerization.

During 3 hours of the reaction time, 74.6 parts of a methanol solution containing 18.7 parts of 3-acrylamide-propyltrimethoxysilane were added dropwise. After unreacted vinyl acetate monomer was expelled by introduction of methanol vapor, a 35% methanol solution of the copolymer was obtained. While 100 parts of the methanol solution were stirred at 40° C., 4 mol% NaOH/methanol solution was added to carry out saponification reaction.

The copolymer formed by this reaction was pulverized and washed to obtain a polyvinyl alcohol modified with the copolymer units represented by the following formula (5-II) in the form of white powdery polymer.

$$\begin{array}{c} +CH_2-CH+ \\ | \\ CNH(CH_2)_3Si(OCH_3)_3 \\ \| \\ O \end{array} \quad (5\text{-II})$$

| | |
|---|---|
| Polymerization degree: | 1200 |
| Saponification degree: | 99.0 mol % |
| Modification degree: | 0.5 mol % |

By use of the modified polyvinyl alcohol as the alignment film, a liquid crystal device was prepared.

A liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pretreatment was practiced in the same manner as in Example 1-1.

The tilt angle θ at that time was measured to be 18°. Also, the tilt angle 18° was found to be maintained over a term of one week or longer.

EXAMPLES 5-2 TO 5-6

TABLE 4-1

| | | Silicon containing modified PVA | | | | |
|---|---|---|---|---|---|---|
| Example | Vinyl silane used for copolymerization | Polymerization degree | Saponification degree mol % | Modification degree mol % | Tilt angle as prepared (θ) | Tilt angle after standing for 1 week after AC application (θ) |
| 4-2 | Vinylmethyldimethoxysilane | 2000 | 98.0 | 12 | 18.0° | 17.0° |
| 4-3 | Vinyltriethoxysilane | 1700 | 98.0 | 9 | 18.5° | 18.0° |
| 4-4 | Allyltrimethoxysilane | 1500 | 97.5 | 14 | 20.5° | 18.0° |
| 4-5 | Vinyltributoxysilane | 1850 | 93.0 | 9 | 20.0° | 20.0° |
| 4-6 | Vinyltriisopropoxysilane | 1600 | 98.0 | 15 | 21.5° | 20.0° |

By use of these respective liquid crystal cells, a display was performed by multiplexing drive similarly as described in Example 1-1. As the result, there was no flickering during writing in every case even one week after the AC application pre-treatment.

EXAMPLE 5-1

Into a reaction tank, 2700 parts of vinyl acetate, 600 parts of methanol and 2.7 parts of 3-acrylamide-propyltrimethoxysilane were charged and, after replacement of the system with nitrogen, heated to 60° C.

Modified polyvinyl alcohols were synthesized and liquid crystal cells were prepared according to entirely the same method as in Example 5-1 except for changing the comonomer 3-acrylamide-propyltrimethoxysilane to acrylamidesilanes shown in Table 5-1, and the same AC application pre-treatment as in Example 5-1 was effected.

The tilt angle θ at that time and the tilt angle θ after standing for one week were measured. These results are shown in Table 5-1 (in the Table, "PVA" represents polyvinyl alcohol).

TABLE 5-1

| | | Amidosilane containing modified PVA | | | | |
|---|---|---|---|---|---|---|
| Example | Acrylamidosilane used for copolymerization | Polymerization degree | Saponification degree mol % | Modification degree mol % | Tilt angle as prepared ($\theta$) | Tilt angle after standing for 1 week after AC application ($\theta$) |
| 5-2 | 3-(meth)acrylamido-propyltripropionyloxysilane | 1800 | 98.0 | 4.5 | 21.0° | 21.0° |
| 5-3 | 2-(meth)acrylamido-ethyldimethylmethoxysilane | 1750 | 96.5 | 0.7 | 22.0° | 20.0° |
| 5-4 | 2-(meth)acrylamido-2-methylpropylmonochlorodimethoxysilane | 1800 | 99.0 | 1.2 | 19.0° | 19.0° |
| 5-5 | 2-(meth)acrylamido-2-methylpropylmethoxysilane | 1200 | 92.5 | 2.1 | 20.5° | 19.5° |
| 5-6 | 2-(meth)acrylamido-propylisopropoxysilane | 1500 | 98.5 | 3.0 | 20.0° | 19.5° |

By use of these respective liquid crystal cells, a display was performed by multiplexing drive similarly as described in Example 1-1. As the result, there was no flickering during writing in every case even one week after the AC application pre-treatment.

EXAMPLE 6-1

A reaction vessel equipped with an agitator, a thermometer, a nitrogen gas introducing pipe, a reflux condenser and a device for adding a thiol compound, was charged with 2400 parts of vinyl acetate and 500 parts of methanol and, after the system was replaced internally with nitrogen under stirring, the inner temperature was elevated to 60° C. Into this system was added 0.17 part of 3-(trimethoxysilyl)propylmercaptan (hereinafter called initial addition of thiol), and further 0.87 part of 2,2'-azobisisobutylonitrile was added to initiate polymerization. Over 3 hours after initiation of the polymerization, 80 parts of a methanol solution containing 1.8 parts of 3-(trimethoxysilyl)propylmercaptan dissolved therein was added continuously (hereinafter called postaddition of thiol). After the polymerization was continued for 3 hours, polymerization was stopped.

After the unreacted vinyl acetate monomer was expelled by introduction of methanol vapor, a 40% methanol solution of a polyvinyl acetate having silyl group at the terminal end was obtained. While the methanol solution of the polymer was stirred at 40° C., a methanol solution containing 5 mol% of sodium hydroxide relative to the vinyl acetate units dissolved therein was added thereinto to carry out saponification reaction. The saponified product obtained was pulverized, washed thoroughly with methanol and dried to give a polyvinyl alcohol type polymer containing silicon group having at least one hydroxyl group at the terminal end.

Polymerization degree: 1080
Saponification degree: 99.7 mol%.

By use of the polyvinyl alcohol type polymer as the alignment film, a liquid crystal device was prepared. A liquid crystal cell was prepared according to entirely the same method as in Example 1-1 except for changing the silicon-containing polyvinyl alcohol resin used in preparation of the liquid crystal cell of Example 1-1 to the modified polyvinyl alcohol resin as described above, and the same AC application pre-treatment as in Example 1-1 was conducted.

The tilt angle $\theta$ at that time was measured to be 19°. Also, the tilt angle 19° was found to be maintained over a term of 1 week or longer.

EXAMPLES 6-2 TO 6-5

Polyvinyl alcohol type polymers were synthesized and liquid crystal cells were prepared according to entirely the same method as in Example 6-1 except for changing the 3-(trimethoxysilyl)propylmercaptan as a silylthiol compound used in synthesis of the polyvinyl alcohol type polymer in Example 6-1 to the silylthiol compounds shown in Table 6-1, and the same AC application pre-treatment as in Example 6-1 was effected.

The tilt angle $\theta$ at that time and the tilt angle $\theta$ after standing for one week were measured. There results are shown in Table 6-1.

TABLE 6-1

| | PVA polymer having reactive silicon group at molecule end | | | | |
|---|---|---|---|---|---|
| Example | Silylthiol compound used for modification | Polymerization degree | Saponification degree mol % | Tilt angle as prepared ($\theta$) | Tilt angle after standing for 1 week after AC application ($\theta$) |
| 6-2 | 3-(triethoxysilyl)propylmercaptan | 1060 | 99.5 | 20.0° | 19.5° |
| 6-3 | 2-(trimethoxysilyl)ethylmercaptan | 1100 | 99.8 | 21.0° | 21.0° |
| 6-4 | 3-(dimethoxysilyl)ethylmercaptan | 1000 | 99.2 | 19.5° | 19.5° |
| 6-5 | 3-(dimethoxy-methylsilyl)propylmercaptan | 1110 | 99.7 | 18.5° | 18.0° |

By use of these respective liquid crystal cells, a display was performed by multiplexing drive similarly as described in Example 1-1. As the result, there was no flickering during writing in every case even one week after the AC application pre-treatment.

EXAMPLE 7-1

Into a reaction tank, 1400 parts of vinyl acetate, 100 parts of methanol and 12 parts of vinyltrimethoxysilane were charged and, after replacement of the system with nitrogen, heated to 60° C. Into this system were added 1142 parts of a methanol solution containing 42 parts of 2,2'-azobisisobutylonitrile to initiate polymerization.

During 5 hours of the reaction time, 101 parts of a methanol solution containing 2.5 parts of vinyltrimethoxysilane were added dropwise. After unreacted vinyl acetate monomer was expelled by introduction of methanol vapor, a 50% methanol solution of the copolymer was obtained. While 100 parts of the methanol solution were stirred at 40° C., 7 parts of methanol solution containing 0.7 parts of NaOH was added to carry out saponification reaction to give a modified polyvinyl alcohol having a site represented by the formula (a) in the form of white powder.

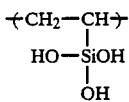  (a)

| Polymerization degree: | 1500 |
| Saponification degree: | 99 mol % |
| Modification degree: | 2 mol % |

By use of the modified polyvinyl alcohol as the alignment film, a liquid crystal device was prepared.

A liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pretreatment was practiced in the same manner as in Example 1-1.

The tilt angle $\theta$ at that time was measured to be 18°. Also, the tilt angle 18° was found to be maintained over a term of one week or longer.

EXAMPLES 7-2 TO 7-5

Modified polyvinyl alcohols were synthesized and liquid crystal cells were prepared according to entirely the same method as in Example 7-1 except for changing the comonomer vinyltrimethoxysilane to vinylsilanes shown in Table 7-1, and the same AC application pretreatment as in Example 7-1 was effected.

The tilt angle $\theta$ at that time and the tilt angle $\theta$ after standing for one week were measured. These results are shown in Table 7-1.

changing the silicon-containing polyvinyl alcohol used in preparation of the liquid crystal cell of Example 1-1 to the sulfur-containing polyvinyl alcohol as described below, and the same AC application pretreatment as Example 1-1 was conducted. The tilt angle $\theta$ at that time and the tilt angle $\theta$ after standing for 1 week were measured to be 17.5° and 14.5°, respectively. Also, when the liquid crystal cell after standing for 1 week was subjected to multiplexing drive according to the same method as in Example 1-1, and noticeable flickering of the picture surface was not observed.

SULFUR-CONTAINING POLYVINYL ALCOHOL

This product was obtained by the reaction of a polyvinyl alcohol having a polymerization degree of 1750 and a saponification degree of 98.2 mol% with methylvinyl sulfoxide in an aqueous 10% sodium hydroxide solution. The modified polyvinyl alcohol had a modification degree of 14.3 mol%.

EXAMPLE 9-1

Into a reaction vessel equipped with an agitator and a thermometer, 845 parts of a 5.2% aqueous solution of a polyvinyl alcohol (polymerization degree 1500, saponification degree 98.2 mol%) were charged and elevated to 60° C. under stirring.

To this solution were added 400 parts of a 10% aqueous sodium hydroxide solution and further 90 parts of methylvinyl sulfoxide, and then the reaction was carried out under stirring at 60° C. for 5 hours.

After the reaction mixture was cooled to 25° C. by cooling externally the reaction vessel, and the reaction mixture was thrown into a large amount of methanol and the modified polymer precipitated was separated by filtration.

The resultant polymer was further washed thoroughly with methanol, thereby removing the catalyst and the unreacted methylvinyl sulfoxide, followed by drying at 70° C. for 5 hours to give 55 parts of a polyvinyl alcohol having a modified site represented by the following formula (9-II):

TABLE 7-1

| | | Modified PVA | | | | |
| Example | Vinylsilane used for modification | Polymerization degree | Saponification degree mol % | Modification degree mol % | Tilt angle as prepared ($\theta$) | Tilt angle after standing for 1 week after AC application ($\theta$) |
| --- | --- | --- | --- | --- | --- | --- |
| 7-2 | Vinylmethyldithitoxysilane | 2000 | 99.1 | 2.5 | 18.5° | 18.5° |
| 7-3 | Vinyltriethoxysilane | 1700 | 99.5 | 2.0 | 19.5 | 19.0 |
| 7-4 | Vinyldimethoxyethoxysilane | 1850 | 99.0 | 1.9 | 21.5° | 21.0° |
| 7-5 | Vinyldimethoxybutoxysilane | 1900 | 99.6 | 1.7 | 21.5° | 20.5° |
| 7-6 | Trimethoxysiloxyethylene | 1850 | 99.2 | 1.4 | 18.5° | 18.5° |
| 7-7 | 1-Acrylamidemethyltrimethoxysilane | 1850 | 99.4 | 1.7 | 19.0° | 19.0° |
| 7-8 | 1-Vinylsulfidemethyltrimethoxysilane | 1900 | 99.3 | 1.8 | 18.5° | 18.5° |
| 7-9 | 2-Vinylsulfoxide ethyltrimethoxysilane | 2000 | 99.5 | 1.2 | 18.5° | 18.5° |

By use of these respective liquid crystal cells, a display was performed by multiplexing drive similarly as described in Example 1-1. As the result, there was no flickering during writing in every case even one week after the AC application pre-treatment.

EXAMPLE 8-1

A liquid crystal cell was prepared according to entirely the same method as in Example 1-1 except for

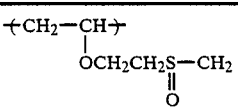 (9-II)

| Polymerization degree: | 1500 |
| --- | --- |
| Saponification degree: | 98.2 mol % |
| Modification degree: | 14.3 mol % |

A liquid crystal cell was prepared according to entirely the same method as in Example 1-1 except for changing the silicon-containing polyvinyl alcohol resin used in preparation of the liquid crystal cell in Example 1-1 to the sulfur-containing polyvinyl alcohol resin as obtained above, and the same AC application pre-treatment was practiced in the same manner as in Example 1-1.

The tilt angle $\theta$ at that time was measured to be 20°. Also, the tilt angle 20° was found to be maintained over a term of one week or longer.

EXAMPLES 9-2 TO 9-5

Modified polyvinyl alcohols were synthesized and liquid crystal cells were prepared according to entirely the same method as in Example 9-1 except for changing methylvinylsulfide of the modifying agent used in synthesis of the modified polyvinyl alcohol of Example 9-1 to vinylsulfides shown Table 9-1, and the same AC application pre-treatment as in Example 9-1 was effected.

The tilt angle $\theta$ at that time and the tilt angle $\theta$ after standing for one week were measured. These results are shown in Table 9-1.

TABLE 9-1

| | | Sulfoxide containing modified PVA | | | | |
| --- | --- | --- | --- | --- | --- | --- |
| Example | Vinylsulfoxide used for modification | Polymerization degree | Saponification degree mol % | Modification degree mol % | Tilt angle as prepared ($\theta$) | Tilt angle after standing for 1 week after AC application ($\theta$) |
| 9-2 | Ethylvinylsulfoxide | 1500 | 98.2 | 12 | 20.0° | 18.5° |
| 9-3 | n-Butylvinylsulfoxide | 1500 | 98.2 | 10 | 19.0° | 18.0° |
| 9-4 | Cyclohexylvinylsulfoxide | 1500 | 98.2 | 8 | 18.5° | 18.0° |
| 9-5 | Benzylvinylsulfoxide | 1500 | 98.2 | 12 | 19.0° | 19.5° |

By use of these respective liquid crystal cells, a display was performed formed by multiplexing drive similarly as described in Example 1-1. As the result, there was no flickering during writing in every case even one week after the alternate current application pre-treatment.

EXAMPLE 10-1

Into a reaction tank were charged 500 parts of vinyl acetate, 120 parts of methanol and 100 parts of methylvinyl sulfoxide and, after replacement of the system with nitrogen, heated to 60° C.

Into this system was charged 100 parts of a methanol solution containing 0.2 part of 2,2'-azobisisobutyronitrile to initiate polymerization.

During 5 hours of the reaction time, 400 parts of a methanol solution containing 300 parts of methylvinyl sulfoxide was added dropwise. After unreacted vinyl acetate and methylvinyl sulfoxide monomer were expelled by introduction of methanol vapor, a 50% methanol solution of the copolymer was obtained. While 300 parts of the methanol solution was stirred at 40° C., 16 parts of a methanol solution containing 1.6 parts of NaOH was added to carry out saponification reaction.

The copolymer formed by this reaction was pulverized and washed to obtain a white powdery polymer.

The above modified polyvinyl alcohol was purified by washing with methyl acetate (containing a small amount of water) under reflux and Soxhlet's washing with methanol for 48 hours to give a polyvinyl alcohol having a modified copolymer units represented by the following formula (10-II):

$$-(CH_2-CH)- \atop | \atop O=S-CH_3 \qquad (10\text{-}II)$$

| Polymerization degree: | 1800 |
| --- | --- |
| Saponification degree: | 96 mol % |
| Modification degree: | 4 mol % |

A liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pre-treatment was practiced in the same manner as in Example 1-1.

The tilt angle $\theta$ at that time was measured to be 18°. Also, the tilt angle 18° was found to be maintained over a term of one week or longer.

EXAMPLES 10-2 TO 10-5

Modified polyvinyl alcohols were synthesized and liquid crystal cells were prepared according to entirely the same method as in Example 10-1 except for changing the comonomer methylvinyl sulfoxide to vinyl sulfoxides shown in Table 10-1, and the same AC application pre-treatment as in Example 10-1 was effected.

The tilt angle $\theta$ at that time and the tilt angle $\theta$ after standing for one week were measured. These results are shown in Table 10-1.

TABLE 10-1

| | | Sulfur containing modified PVA | | | | |
| --- | --- | --- | --- | --- | --- | --- |
| Example | Vinylsulfixide used for copolymerization | Polymerization degree | Saponification degree mol % | Modification degree mol % | Tilt angle as prepared ($\theta$) | Tilt angle after standing for 1 week after AC application ($\theta$) |
| 10-2 | 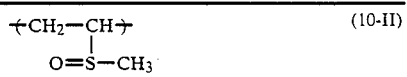 | 1800 | 97.0 | 10 | 20.0° | 20.0° |

TABLE 10-1-continued

| Example | Vinylsulfixide used for copolymerization | Sulfur containing modified PVA Polymerization degree | Saponification degree mol % | Modification degree mol % | Tilt angle as prepared ($\theta$) | Tilt angle after standing for 1 week after AC application ($\theta$) |
|---|---|---|---|---|---|---|
| 10-3 | CH$_2$=CHS(O)—C$_6$H$_{11}$ | 1900 | 96.5 | 8 | 21.5° | 20.5° |
| 10-4 | CH$_2$=CHS(O)—nBu | 1600 | 98.5 | 14 | 20.0° | 10.9° |
| 10-5 | CH$_2$=CHSCH$_2$—C$_6$H$_5$ (O) | 1500 | 98.5 | 8 | 21.0° | 17.5° |

By use of these respective liquid crystal cells, a display was performed by multiplexing drive similarly as described in Example 1-1. As the result, there was no flickering during writing in every case even one week after the alternate current application pre-treatment.

EXAMPLE 11-1

Into a reaction tank were charged 960 parts of vinyl acetate, 230 parts of methanol and 0.99 parts of n-dodecylmercaptan and, after replacement internally of the system with nitrogen, heated to 65° C. Into this system was added 10 parts of a methanol solution containing 0.174 parts of 2,2'-azobisisobutylonitrile to initiate polymerization.

During 5 hours of the reaction time, 60 parts of a methanol solution containing 15.3 parts of n-dodecylmercaptan was added dropwise. After 5 hours, the vessel was cooled and the operation of expelling residual vinyl acetate together with methanol out of the system under reduced pressure was conducted while expelling out methanol to obtain a 72% methanol solution of PVAc.

A part of the methanol solution was sampled and a methanolic solution of NaOH was added to provide a PVAc concentration of 50%, (NaOH)/(vinyl acetate)=0.1 (molar ratio), thereby to effect saponification at 40° C. As a result, a modified polyvinyl alcohol with a saponification degree of 99.2% was obtained.

The above modified polyvinyl alcohol was purified by washing with methyl acetate (containing a small amount of water) under reflux and Soxhlet's washing with methanol for 48 hours to give a modified polyvinyl alcohol represented by the formula (11-II):

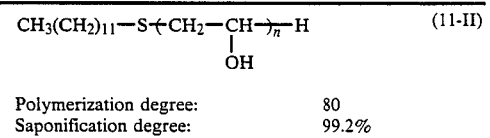

$$CH_3(CH_2)_{11}-S+CH_2-CH)_n-H \quad (11\text{-}II)$$
$$\qquad\qquad\qquad\qquad\quad |$$
$$\qquad\qquad\qquad\qquad\quad OH$$

| Polymerization degree: | 80 |
|---|---|
| Saponification degree: | 99.2% |

A liquid crystal cell was prepared according to entirely the same method as in Example 1-1 except for changing the silicon containing polyvinyl alcohol resin used in preparation of the liquid crystal cell in Example 1-1 to the modified polyvinyl alcohol resin as described above, and the same AC application pre-treatment was practiced in the same manner as in Example 1-1.

The tilt angle $\theta$ at that time was measured to be 18°. Also, the tilt angle 18° was found to be maintained over a term of one week or longer.

EXAMPLES 11-2 TO 11-4

Liquid crystal cells were prepared according to entirely the same method as in Example 11-1 except for changing the modified polyvinyl alcohol resin used in preparation of the liquid crystal cell of Example 11-1 to the modified polyvinyl alcohols shown in Table 11-1, and the same AC application pretreatment as in Example 11-1 was conducted.

The tilt angle $\theta$ at that time and the tilt angle $\theta$ after standing for 1 week were measured. These results are shown in Table 11-1.

TABLE 11-1

| Example | Sulfur containing modified PVA | Polymerization degree | Saponification degree mol % | Tilt angle as prepared ($\theta$) | Tilt angle after standing for 1 week after AC application ($\theta$) |
|---|---|---|---|---|---|
| 11-2 | nBu—S(CH$_2$—CH(OH))$_n$—H | 120 | 97.0 | 19.5° | 18.0° |
| 11-3 | nOc—S(CH$_2$—CH(OH))$_n$—H | 100 | 96.5 | 21.0° | 20.0° |
| 11-4 | iOc—S(CH$_2$—CH(OH))$_n$—H | 180 | 98.0 | 18.5° | 17.5° |

EXAMPLE 12-1

A reaction tank equipped with an agitator, a thermometer, a dropping funnel and a reflux condenser was charged with a mixture of 1400 parts of vinyl acetate, 2500 parts of methanol and 1.7 parts of 1-vinyl-2-methylimidazole, placed in a thermostat tank and a system was internally replaced with nitrogen under stirring, followed by elevation of the inner temperature of 60° C. Into this system was added 21 parts of 2,2'-azobisisobutylonitrile as a radical initiator to initiate polymerization. During 2 hours and 30 minutes of the polymerization time, 10 parts of 1-vinyl-2-methylimidazole was added dropwise corresponding to the solid concentration in the system. The vinyl acetate monomer remaining in the system was expelled out according to a conventional method.

By saponifying the copolymer of vinyl acetate and 1-vinyl-2-methylimidazole thus obtained with caustic soda, a polyvinyl alcohol having a modified site (unit) represented by the following formula (12-II) was obtained.

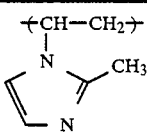
(12-II)

| Polymer | Polymerization degree: | 1900 |
|---|---|---|
| | Saponification degree: | 91 mol % |
| | Modification degree: | 0.4 mol % |

A liquid crystal cell was prepared according to entirely the same method as in Example 1-1 except for changing the silicon containing polyvinyl alcohol resin used in preparation of the liquid crystal cell in Example 1-1 to the modified polyvinyl alcohol resin as described above, and the same AC application pre-treatment was practiced in the same manner as in Example 1-1.

The tilt angle θ at that time was measured to be 19°. Also, the tilt angle 19° was found to be maintained over a term of one week or longer.

EXAMPLE 12-2

An autoclave of 1 liter inner volume equipped with an electromagnetic vertical agitator was charged with 250 parts of vinyl acetate, 100 parts of t-butyl alcohol and 0.5 part of azobisisobutylonitrile, and then nitrogen has was blown into the mixture for about 5 minutes to remove the air dissolved therein by replacement, followed by closing of the lid of the autoclave. Further, replacement was repeated by blowing nitrogen gas into the autoclave. The same operation was also conducted with the use of ethylene gas. Subsequently, heating was initiated under stirring and ethylene was charged by pressurization from a bomb. Subsequently, after stirring was continued at a reaction temperature of 65° C. for 3 hours. The reaction was stopped by cooling the autoclave to room temperature and unreacted ethylene was released. After the inner pressure in the autoclave became equal to the external pressure, the lid was opened and the reaction mixture ws taken out and thrown into a large amount of water to be precipitated. The product was subjected to precipitation purification with an acetone-water system to give a copolymer of ethylene and vinyl acetate. The copolymer of vinyl acetate and ethylene thus obtained was saponified with a caustic soda.

Polymerization degree: 1500
Modification degree: 17%
Saponification degree: 99.2%.

By use of the modified polyvinyl alcohol, a liquid crystal device was prepared according to the same operation as in Example 12-1. To the liquid crystal cell prepared, a high electrical field alternate current at a voltage of 70 volt and a frequency of 70 Hz was applied in the same manner as in Example 12-1 for about 1 minute (AC application pre-treatment). The tilt angle θ at this time was measured to be 18.5°. Also, the liquid crystal cell of this Example was found to maintain a tilt angle of 18° or higher over a term of one week or longer, and there was no flickering during writing.

EXAMPLES 12-3 to 12-5

Except for using the modified polyvinyl alcohols having modified sites shown by the following formulae (12-III) to (12-V), cells were prepared according to the same method as in Example 12-1 and the same AC application pre-treatment as in Example 12-1 was conducted.

The tilt angle θ at that time and the tilt angle θ after standing for 1 week were measured. These results are shown in Table 12-1.

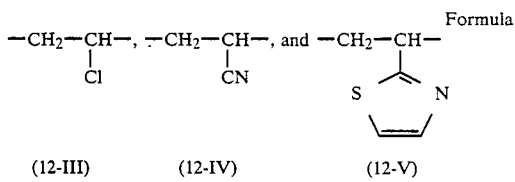

Formula (12-III)  (12-IV)  (12-V)

TABLE 12-1

| | | | Modified PVA | | | |
|---|---|---|---|---|---|---|
| Example | Olefin used for modification | Polymerization degree | Saponification degree mol % | Modification degree mol % | Tilt angle as prepared (θ) | Tilt angle after standing for 1 week after AC application (θ) |
| 12-3 | Chloroethylene (Formula IV) | 1950 | 99.5 | 3 | 19.0 | 19.0 |
| 12-4 | Acrylonitrile (Formula V) | 2200 | 98.5 | 15 | 18.5 | 18.0 |
| 12-5 | Vinylthiazole (Formula VI) | 1500 | 99.0 | 0.4 | 20.0 | 19.0 |

By use of these respective liquid crystal cells, a display was performed by multiplexing drive similarly as described in Example 12-1. As the result, there was no flickering during writing in every case even one week after the AC application pre-treatment.

EXAMPLE 13-1

After 10 g of a polyvinyl alcohol (polymerization degree 1700, saponification degree 99.5 mol%) was dissolved in 90 g of diionized water in a 200 ml Erlenmeyer's flask, 8 ml of a 10% aqueous sodium hydroxide solution, 15.0 g of N-methylolacrylamide and 0.015 g of hydroquinone monomethyl ether were added to carry out the reaction at 65° C. for 3 hours.

After the reaction, the reaction mixture was poured into excessive methanol. The precipitates were filtered, further washed thoroughly with methanol to remove the catalyst and unreacted matters, followed by drying to a constant weight by a vacuum dryer at 50° C. to give 11.6 g of a polyvinyl alcohol having a modified site represented by the following formula (13-II):

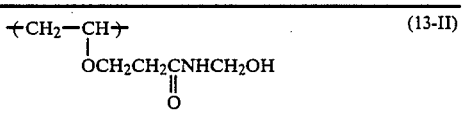

| | |
|---|---|
| Polymerization degree: | 1700 |
| Saponification degree: | 99.5 mol % |
| Modification degree: | 7.8 mol % |

By use of the modified polyvinyl alcohol as the alignment film, a liquid crystal device was prepared.

More specifically, a liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pre-treatment was practiced in the same manner as in Example 1-1.

The tilt angle $\theta$ at that time was measured to be 18°. Also, the tilt angle 18° was found to be maintained over a term of one week or longer.

EXAMPLES 13-2 to 13-5

Modified polyvinyl alcohols were synthesized and liquid crystal cells were prepared according to entirely the same method as in Example 13-1 except for changing N-methylolacrylamide as the modifying agent used in synthesis of the modified polyvinyl alcohol of Example 13-1 to acrylamides shown Table 13-1, and the same AC application pre-treatment as in Example 13-1 was effected.

The tilt angle $\theta$ at that time and the tilt angle $\theta$ after standing for one week were measured. These results are shown in Table 13-1.

TABLE 13-1

| | | Amide containing modified PVA | | | | |
|---|---|---|---|---|---|---|
| Example | Acrylamide used for modification | Polymerization degree | Saponification degree mol % | Modification degree mol % | Tilt angle as prepared ($\theta$) | Tilt angle after standing for 1 week after AC application ($\theta$) |
| 13-2 | N—methylolmethacrylamide | 2000 | 97.0 | 15 | 18.0° | 16.5° |
| 13-3 | N—methoxymethylmethacrylamide | 1950 | 98.0 | 18 | 19.0° | 18.0° |
| 13-4 | N—n-propoxymethylacrylamide | 1700 | 96.0 | 8 | 21.5° | 20.0° |
| 13-5 | N—n-butoxymethylacrylamide | 1500 | 93.0 | 12 | 21.5° | 21.0° |

By use of these respective liquid crystal cells, display picture surfaces were formed by multiplexing drive similarly as described in Example 13-1. As the result, there was no flickering during writing in every case even one week after the AC application pre-treatment.

EXAMPLE 14-1

Into a reaction tank were charged 500 parts of vinyl acetate, 120 parts of methanol, 6 parts of N-methoxymethylacrylamide and 0.2 parts of 2,2'-azobisisobutylonitrile and heated to 63° C.

During 90 minutes of the reaction time, 15 parts of N-methoxymethylacrylamide was added dropwise correspondingly to the solid concentration. This polymerization solution was charged into a distilling toner, and unreacted vinyl acetate monomer was distilled off by introducing methanol vapor from the tower bottom to obtain a 33% methanolic solution of a copolymer. While 300 parts of the methanolic solution was stirred at 40° C., 12 parts of 1N NaOH methanolic solution were added thereinto to carry out saponification reaction.

10 minutes later, the whole mixture was gelled. The copolymer was pulverized and washed to obtain a polyvinyl alcohol having a modified copolymer unit represented by the following formula (III) as white powdery polyler:

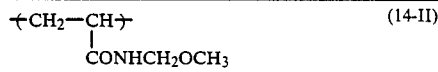

| | |
|---|---|
| Polymerization degree: | 2200 |
| Saponification degree: | 97.2 mol % |
| Modification degree: | 8.8 mol % |

A liquid crystal cell was prepared according to entirely the same method as in Example 1-1 except for changing the silicon-containing polyvinyl alcohol resin used in preparation of the liquid crystal cell in Example 1-1 to the modified polyvinyl alcohol resin as described above, and the same AC application pre-treatment was practiced in the same manner as in Example 1-1.

The tilt angle $\theta$ at that time was measured to be 18°. Also, the tilt angle 18° was found to be maintained over a term of one week or longer.

EXAMPLES 14-2 to 14-5

Modified polyvinyl alcohols were synthesized and liquid crystal cells were prepared according to entirely the same method as in Example 14-1 except for changing the comonomer N-methoxymethylacrylamide used in synthesis of the modified polyvinyl alcohol of Example 14-1 to acrylamides shown Table 14-1, and the same AC application pre-treatment as in Example 14-1 was effected.

The tilt angle θ at that time and the tilt angle θ after standing for one week were measured. These results are shown in Table 14-1.

above, and the same AC application pre-treatment was practiced as in Example 1-1.

The tilt angle θ at that time was measured to be 18°.

TABLE 14-1

| | | Amide containing modified PVA | | | | |
|---|---|---|---|---|---|---|
| Example | Acrylamide used for copolymerization | Polymerization degree | Saponification degree mol % | Modification degree mol % | Tilt angle as prepared (θ) | Tilt angle after standing for 1 week after AC application (θ) |
| 14-2 | $CH_2=CH-CONHCH_2OEt$ | 2000 | 97.0 | 11 | 19.0° | 18.5° |
| 14-3 | $CH_2=CHCONHCH_2O-nPr$ | 1950 | 98.0 | 8 | 18.5° | 18.0° |
| 14-4 | $CH_2=CHCONHCH_2O-nBu$ | 1700 | 96.0 | 12 | 21.0° | 20.0° |
| 14-5 | $CH_2=CHCONHCH_2O-tBu$ | 1500 | 93.0 | 7 | 18.0° | 17.5° |

By use of these respective liquid crystal cells, a display was performed by multiplexing drive similarly as described in Example 1-1. As the result, there was no flickering during writing in every case even one week after the alternate current application pre-treatment.

EXAMPLE 15-1

In a 20 ml Erlenmeyer's flask, a minute amount of hydrochloric acid was added to 2.0 g of a polyvinyl alcohol (polymerization degree 1500, saponification degree 99.5 mol%) and 2.0 g of cyclohexanone, and the mixture was heated to 45° C. under stirring.

After 30 minutes, 4 ml of benzene was added and the reaction was carried out for 5 hours. After the reaction, the reaction mixture was poured into a large amount of methanol containing sodium hydroxide necessary for neutralization and the precipitate was filtered. Further, the polymer obtained was thoroughly washed with methanol to remove the catalyst and unreacted materials, etc., and dried to a constant weight in a vacuum dryer at 50° C. to give 2.5 g of a polyvinyl alcohol having modified sites represented by the following formula (15-II):

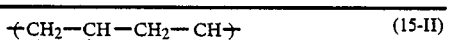

Polymerization degree: 1500
Saponification degree: 99.5 mol %
Modification degree: 9 mol %

A liquid crystal cell was prepared according to entirely the same method as in Example 1-1 except for changing the silicon containing polyvinyl alcohol resin used in preparation of the liquid crystal cell in Example 1-1 to the modified polyvinyl alcohol resin as described Also, the tilt angle 18° was found to be maintained over a term of one week or longer.

EXAMPLES 15-2 to 15-5

Modified polyvinyl alcohols were synthesized and liqid crystal cells were prepared according to entirely the same method as in Example 15-1 except for changing cyclohexanone as a modifying agent used in synthesis of the modified polyvinyl alcohol of Example 15-1 to carbonyl compounds shown Table 15-1, and the samd AC application pre-treatment as in Example 15-1 was effected.

The tilt angle θ at that time and the tilt angle θ after standing for one week were measured. These results are shown in Table 15-1.

TABLE 15-1

| | | 1,3-Dioxane containing modified PVA | | | | |
|---|---|---|---|---|---|---|
| Example | Carbonyl compound used for modification | Polymerization degree | Saponification degree mol % | Modification degree mol % | Tilt angle as prepared (θ) | Tilt angle after standing for 1 week after AC application (θ) |
| 15-2 | Formaldehyde | 1500 | 97.0 | 11 | 18.0° | 16.5° |
| 15-3 | Acetaldehyde | 1500 | 98.0 | 9 | 18.5° | 18.0° |
| 15-4 | Propioaldehyde | 1500 | 96.0 | 6 | 18.5° | 18.0° |
| 15-5 | p-Fluorobenzaldehyde | 1500 | 93.0 | 10 | 18.5° | 17.5° |

By use of these respective liquid crystal cells, a display was performed by multiplexing drive similarly as described in Example 15-1. As the result, there was no flickering during writing in every case even one week after the AC application pre-treatment.

EXAMPLE 16-1

A liquid crystal cell was prepared according to entirely the same method as in Example 1-1 except for changing the silicon-containing polyvinyl alcohol resin used in preparation of the liquid crystal cell of Example 1-1 to a boron-containing polyvinyl alcohol of the formula (16) as described above (polymerization degree=1750, saponification degree=96.5 mol%, x/(x+y) mol%=7 mol%), and the same AC application pre-treatment as in Example 1-1 was conducted. The tilt angle θ at that time and the tilt angle θ after standing for 1 week were measured to be 16.5° and 14°, respectively. Also, the liquid crystal cell after standing for 1 week was subjected to multiplexing drive according to the same method as in Example 1-1, and no visual flickering on the picture was observed.

COMPARATIVE EXAMPLE 1

A liquid crystal cell was prepared according to entirely the same method as in Example 1-1 except for changing the silane-modified polyvinyl alcohol resin used in preparation of the liquid crystal cell of Example 1-1 to a polyimide resin (polyimide formed by subjecting a coating film of a 3.5 wt.% N-methyl2-pyrrolidone solution of a polyamic acid obtained by dehydrating concensation reaction of 3,3',4,4'-diphenyltetracarboxylic anhydride and p-phenylenediamine at a molar ratio of 1:1 to dehydrating cyclization), and the same AC application pre-treatment as in Example 1-1 was conducted.

The tilt angle $\theta$ of the liquid cyrstal cell at that time was measured to be 8°. Also, when the liquid crystal cell used to form a display picture by the same multiplexing drive as in Example 1-1, flickering was found to be generated during writing.

COMPARATIVE EXAMPLE 2

A liquid crystal cell was prepared according to entirely the same method as in Example 1-1 except for changing the silane modified polyvinyl alcohol resin to non-modified polyvinyl alcohol, and the same AC application pre-treatment was conducted.

The tilt angle $\theta$ of the liquid crystal cell at that time was measured to be 17.5°. Further, the time period in which the tilt angle $\theta$ of 18° possessed by this liquid crystal cell was maintained was measured, whereby it was found that the tilt angle was reduced to 15.5° on the second day and the tilt angle was reduced to about 10° after one week. Also, when the liquid crystal cell after standing for 1 week was used to form a display picture by the same multiplexing drive as in Example 1-1, flickering was found to be generated during writing.

According to the present invention, it is possible to realize a ferroelectric liquid crystal of uniform alignment state capable of obtaining an increased tilt angle, and also the uniform alignment state can be maintained stably over a long term.

What is claimed is:

1. In a liquid crystal device, comprising: a pair of parallel substrates and a ferroelectric liquid crystal disposed between the substrates so as to have an arrangement of molecules forming a plurality of layers perpendicular to the faces of said pair of parallel substrates; the improvement wherein at least one of said pair of parallel substrates has an alignment control film formed of a modified polyvinyl alcohol resin containing silicon having a function of aligning said plurality of layers preferentially in one direction.

2. A liquid crystal device according to claim 1, wherein said modified polyvinyl alcohol resin is a modified polyvinyl alcohol containing structural units represented by any one of the formulae (1a), (1b) and (1c) shown below:

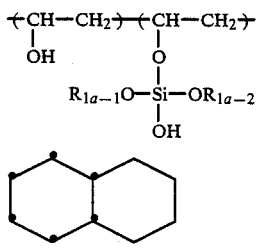

(1a)

(wherein $R_{1a-1}$ and $R_{1a-2}$ each represent an alkyl group having 1 to 8 carbon atoms),

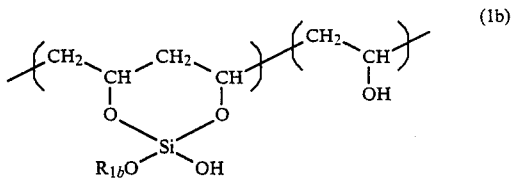

(1b)

(wherein $R_{1b}$ represents an alkyl group having 1 to 8 carbon atoms), and

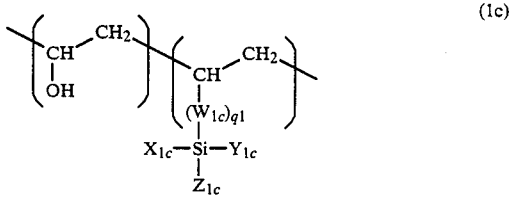

(1c)

(wherein $X_{1c}$, $Y_{1c}$ and $Z_{1c}$ each represent an alkyl group having 1 to 8 carbon atoms, an alkoxy group having 1 to 8 carbon atoms or a hydroxy group, $W_{1c}$ is —O—, —(CH$_2$)$_{\overline{n1}}$, —O—(CH$_2$)$_{\overline{m1}}$ or —O—(CH$_2$)$_{\overline{n1}}$O—, q1 represents 0 or 1, l1, m1 and n1 each represent an integer of 1 to 8).

3. A liquid crystal device according to claim 2, wherein said modified polyvinyl alcohol is modified to a degree of 30 mol% or less.

4. A liquid crystal device according to claim 2, wherein said modified polyvinyl alcohol is modified to a degree of 1 to 20 mol% or less.

5. A liquid crystal device according to claim 2, wherein said modified polyvinyl alcohol is modified to a degree of 1 to 10 mol% or less.

6. A liquid crystal device according to claim 2, wherein said modified polyvinyl alcohol has a polymerization degree of 100 to 10,000.

7. A liquid crystal device according to claim 2, wherein said modified polyvinyl alcohol has a polymerization degree of 500 to 2000.

8. A liquid crystal device according to claim 1, wherein said modified polyvinyl alcohol resin is a modified polyvinyl alcohol containing structural units represented by the formula (2):

(2)

(wherein $R_{2-1}$ and $R_{2-2}$ each represent an alkyl group having 1 to 6 carbon atoms or an aryl group).

9. A liquid crystal device according to claim 8, wherein said modified polyvinyl alcohol contains polysiloxane as structural units.

10. A liquid crystal device according to claim 8, wherein said modified polyvinyl alcohol is synthesized by saponifying a block copolymer of a polyvinyl ester-type polymer and polysiloxane.

11. A liquid crystal device according to claim 8, wherein said modified polyvinyl alcohol is modified to a degree of 60 mol% or less.

12. A liquid crystal device according to claim 8, wherein said modified polyvinyl alcohol is modified to a degree of 0.05 to 50 mol% or less.

13. A liquid crystal device according to claim 8, wherein said modified polyvinyl alcohol is modified to a degree of 0.05 to 10 mol% or less.

14. A liquid crystal device according to claim 8, wherein said modified polyvinyl alcohol has a polymerization degree of 1000 to 90,000.

15. A liquid crystal device according to claim 8, wherein said modified polyvinyl alcohol has a polymerization degree of 10,000 to 70,000.

16. A liquid crystal device according to claim 1, wherein said modified polyvinyl alcohol resin is a modified polyvinyl alcohol containing structural units represented by the formula (3):

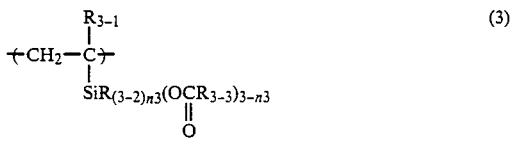

(3)

(wherein $R_{3-1}$ represents hydrogen atom or methyl group, $R_{3-2}$ represents hydrogen atom, a halogen atom, a lower alkyl group, an allyl group or a lower alkyl group having allyl group, $R_{3-3}$ represents a lower alkyl group and n3 represents an integer of 0 to 2).

17. A liquid crystal device according to claim 16, wherein said modified polyvinyl alcohol is modified to a degree of 30 mol% or less.

18. A liquid crystal device according to claim 16, wherein said modified polyvinyl alcohol is modified to a degree of 0.05 to 20 mol% or less.

19. A liquid crystal device according to claim 16, wherein said modified polyvinyl alcohol is modified to a degree of 0.05 to 10 mol% or less.

20. A liquid crystal device according to claim 16, wherein said modified polyvinyl alcohol has a polymerization degree of 100 to 10,000.

21. A liquid crystal device according to claim 16, wherein said modified polyvinyl alcohol has a polymerization degree of 500 to 2000.

22. A liquid crystal device according to claim 1, wherein said modified polyvinyl alcohol resin has a film of a modified polyvinyl alcohol containing structural units represented by either one of the formula (4):

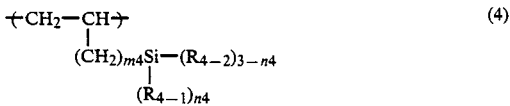

(4)

(wherein m4 is 0 to 1, n4 is 0 to 2, $R_{4-1}$ is a lower alkyl group, allyl group or a lower alkyl group having allyl group, $R_{4-2}$ is a saturated branched or non-branched alkoxyl group having 1 to 40 carbon atoms, and said alkoxyl group can also have a substituent containing oxygen).

23. A liquid crystal device according to claim 22, wherein said modified polyvinyl alcohol is modified to a degree of 30 mol% or less.

24. A liquid crystal device according to claim 22, wherein said modified polyvinyl alcohol is modified to a degree of 0.05 to 20 mol% or less.

25. A liquid crystal device according to claim 22, wherein said modified polyvinyl alcohol is modified to a degree of 0.05 to 10 mol% or less.

26. A liquid crystal device according to claim 22, wherein said modified polyvinyl alcohol has a polymerization degree of 100 to 10,000.

27. A liquid crystal device according to claim 22, wherein said modified polyvinyl alcohol has a polymerization degree of 500 to 2000.

28. A liquid crystal device according to claim 1, wherein said modified polyvinyl alcohol resin is a modified polyvinyl alcohol containing structural units represented by the formula (5):

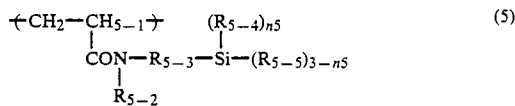

(5)

(wherein $R_{5-1}$ is hydrogen atom or methyl group, $R_{5-2}$ is hydrogen atom or a lower alkyl group, $R_{5-3}$ is an alkylene group or a divalent organic residue in which the chain carbon atoms are mutually bonded through an oxygen atom or a nitrogen atom, $R_{5-4}$ is hydrogen atom, a halogen atom, a lower alkyl group, an aryl group or a lower alkyl group having an aryl group, $R_{5-5}$ is hydroxyl group, a salt of hydroxyl group represented by the formula OM (M represents alkyl metal or $NH_4^{\oplus}$), an alkoxy group or an acyloxy group (with proviso that alkoxy group or acyloxy group is a saturated branched or non-branched alkoxy or acyloxy group having 1 to 40 carbon atoms, and can also have a substituent containing oxygen atom or nitrogen atom), n5 is an integer of 0 to 2).

29. A liquid crystal device according to claim 28, wherein said modified polyvinyl alcohol is modified to a degree of 30 mol% or less.

30. A liquid crystal device according to claim 28, wherein said modified polyvinyl alcohol is modified to a degree of 0.05 to 20 mol% or less.

31. A liquid crystal device according to claim 28, wherein said modified polyvinyl alcohol is modified to a degree of 0.05 to 10 mol% or less.

32. A liquid crystal device according to claim 28, wherein said modified polyvinyl alcohol has a polymerization degree of 100 to 10,000.

33. A liquid crystal device according to claim 28, wherein said modified polyvinyl alcohol has a polymerization degree of 500 to 2000.

34. A liquid crystal device according to claim 1, wherein said modified polyvinyl alcohol resin is a polyvinyl alcohol-type polymer containing reactive silicon groups obtained by hydrolysis of silyl group represented by the following formula (6):

(6)

(wherein $R_{6-1}$ is a hydrocarbon group having 1 to 20 carbon atoms, $R_{6-2}$ is a group selected from an alkoxy group having 1 to 20 carbon atoms, a phenoxy group, an alkylphenoxy group or an acyloxy group (wherein the alkoxy group, phenoxy group, alkylphenoxy group or acyloxy group can also have a substituent containing oxygen), l6 is an integer of 1 to 3).

35. A liquid crystal device according to claim 34, wherein said modified polyvinyl alcohol type polymer is modified to a degree of 40 mol% or less.

36. A liquid crystal device according to claim 34, wherein said modified polyvinyl alcohol type polymer is modified to a degree of 0.05 to 20 mol% or less.

37. A liquid crystal device according to claim 34, wherein said modified polyvinyl alcohol type polymer is modified to a degree of 0.05 to 10 mol% or less.

38. A liquid crystal device according to claim 34, wherein said modified polyvinyl alcohol type polymer has a polymerization degree of 100 to 10,000.

39. A liquid crystal device according to claim 34, wherein said modified polyvinyl alcohol type polymer has a polymerization degree of 500 to 2000.

40. A liquid crystal device according to claim 1, wherein said modified polyvinyl alcohol resin comprises a saponified product of a copolymer obtained by copolymerization of a monomer represented by the following formula (7) and a vinyl ester:

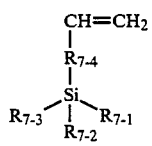

(7)

(wherein $R_{7-1}$, $R_{7-2}$ and $R_{7-3}$ each represent an alkyl group, an aryl group, an alkyl group having aryl group, an alkoxy group or hydroxy group, at least one of $R_{7-1}$, $R_{7-2}$ and $R_{7-3}$ is hydroxy group, $R_{7-4}$ is $-(CH_2)_{n7}$ or a divalent organic residue having $-(CH_2)_{n7}$ and nitrogen atom, sulfur atom or oxygen atom, with proviso that n7 is an integer of 0 or 1 to 10).

41. A liquid crystal device according to claim 40, wherein said modified polyvinyl alcohol is modified to a degree of 40 mol% or less.

42. A liquid crystal device according to claim 40, wherein said modified polyvinyl alcohol is modified to a degree of 0.05 to 20 mol% or less.

43. A liquid crystal device according to claim 40, wherein said modified polyvinyl alcohol is modified to a degree of 0.05 to 10 mol% or less.

44. A liquid crystal device according to claim 40, wherein said modified polyvinyl alcohol has a polymerization degree of 100 to 10,000.

45. A liquid crystal device according to claim 40, wherein said modified polyvinyl alcohol has a polymerization degree of 500 to 2000.

46. A liquid crystal device according to claim 1, wherein said alignment control film has a uniaxial orientation axis.

47. A liquid crystal device according to claim 46, wherein said uniaxial orientation axis has been imparted by rubbing.

48. A liquid crystal device according to claim 1, wherein said ferroelectric liquid crystal is in a chiral smectic phase.

49. A liquid crystal device according to claim 1, wherein said ferroelectric liquid crystal is a liquid crystal which exhibits at least two stable orientation states under no electrical field.

* * * * *

UNITED STATES PATENT AND TRADEMARK OFFICE
CERTIFICATE OF CORRECTION

PATENT NO. : 4,820,026
DATED : April 11, 1989
INVENTOR(S) : SHINJIRO OKADA ET AL.

Page 1 of 2

It is certified that error appears in the above-identified patent and that said Letters Patent is hereby corrected as shown below:

ON THE TITLE PAGE,
AT [57] REFERENCES CITED

Attorney, Agent, or Firm, "Fitzpatrick Cella, Harper & Scinto" should read
    --Fitzpatrick, Cella, Harper & Scinto--.

COLUMN 4

Formulae (1b), " $\rangle\!\!\!\diagup_{\!\!\!CH\diagdown_Y}$ (1b)" should read -- $\diagup\!\!\!\rangle\!\!\!\diagup_{\!\!\!CH\diagdown_Y}$ (1b)--.

Formulae (1c), " $\diagup(CH_2)_x\diagdown$ " should read --  --.

COLUMN 5

Line 25, "ans X" should read --and--.

COLUMN 8

Line 49, "500 to 20000." should read --500 to 2000.--.

COLUMN 14

Line 12, "formulae ①- 5" should read
    --formulae ①-⑤--.
    Formulae 3, "-C-C=CH₃" should read ---$\underset{\underset{O\ \ CH_3}{}}{\overset{\overset{}{||\ \ |}}{C\text{-}C}}$=CH₃--.
                   O CH₃

UNITED STATES PATENT AND TRADEMARK OFFICE
CERTIFICATE OF CORRECTION

PATENT NO. : 4,820,026
DATED : April 11, 1989
INVENTOR(S) : SHINJIRO OKADA ET AL.    Page 2 of 2

It is certified that error appears in the above-identified patent and that said Letters Patent is hereby corrected as shown below:

COLUMN 42

Table 10-1 Cont., Example 10-4, "10.9°" should read --19.0°--.

COLUMN 49

Line 62, " 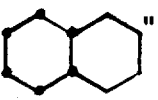 " should be deleted.

COLUMN 51

Line 46, "either one of the" should be deleted.

COLUMN 52

Line 12, "$\{CH_2-CH_{5-1}\}$" should read --$\{CH_2-CR_{5-1}\}$--.

Signed and Sealed this

Twenty-sixth Day of June, 1990

Attest:

HARRY F. MANBECK, JR.

Attesting Officer    Commissioner of Patents and Trademarks